United States Patent
Vernhes et al.

(10) Patent No.: US 11,940,084 B2
(45) Date of Patent: Mar. 26, 2024

(54) THERMAL INSULATING SLEEVE LINER FOR FLUID FLOW DEVICE AND FLUID FLOW DEVICE INCORPORATING SUCH LINER

(71) Applicant: Velan Inc., Montreal (CA)

(72) Inventors: Luc David Vernhes, Hampstead (CA); Fadila Khelfaoui, Montreal (CA); Alfredo Vincenzo Costantini, Laval (CA); Duc Thanh Tran, Montreal (CA)

(73) Assignee: VELAN INC., Quebec (CA)

( * ) Notice: Subject to any disclaimer, the term of this patent is extended or adjusted under 35 U.S.C. 154(b) by 384 days.

(21) Appl. No.: 17/030,760

(22) Filed: Sep. 24, 2020

(65) Prior Publication Data

US 2021/0018136 A1    Jan. 21, 2021

Related U.S. Application Data

(63) Continuation-in-part of application No. PCT/IB2020/052256, filed on Mar. 12, 2020.

(Continued)

(51) Int. Cl.
*F16L 9/18* (2006.01)
*F16L 59/02* (2006.01)

(Continued)

(52) U.S. Cl.
CPC .......... *F16L 59/147* (2013.01); *F16L 59/021* (2013.01); *F16L 59/06* (2013.01); *F16L 59/143* (2013.01); *F16L 59/16* (2013.01)

(58) Field of Classification Search
CPC ....... F16L 59/147; F16L 59/021; F16L 59/06; F16L 59/143; F16L 59/16

(Continued)

(56) References Cited

U.S. PATENT DOCUMENTS

| 2,013,193 | A | * | 9/1935 | Stadtfeld | ................. F16L 59/07 138/148 |
| 2,078,606 | A | | 4/1937 | Le Grand | |

(Continued)

FOREIGN PATENT DOCUMENTS

| CN | 1978970 | 6/2007 |
| CN | 105202294 | 12/2015 |

(Continued)

OTHER PUBLICATIONS

AXENS Ebullated Bed Hydrocracking Process, printed on Jan. 13, 2020 from https://www.axens.net/product/process-licensing/10092/h-oil-rc.html, 3 pp.

(Continued)

*Primary Examiner* — James F Hook
(74) *Attorney, Agent, or Firm* — Nixon & Vanderhye, PC

(57) ABSTRACT

A monolithic metal thermal insulating sleeve liner for fluid flow devices such as valves and piping used in severe industrial applications is additively manufactured (e.g., by 3D printing) to fit the bore of a protected fluid flow device. Tessellated support structures obliquely extending between inside surfaces of inner and outer shells provide increased resistance to thermal conduction while also providing increased strength against compression forces. Example support structures include an array of four obliquely oriented elongated members mutually intersecting mid-way between the inside surfaces of inner and outer cylindrical shells. If internal interstices are sealed they can be vacuumed or pressurized to enhance thermal insulating properties. A pressure equalizing aperture can be provided on or through the sleeve if needed in some applications.

18 Claims, 16 Drawing Sheets

Related U.S. Application Data

(60) Provisional application No. 62/823,357, filed on Mar. 25, 2019.

(51) Int. Cl.
  *F16L 59/06* (2006.01)
  *F16L 59/14* (2006.01)
  *F16L 59/147* (2006.01)
  *F16L 59/16* (2006.01)

(58) Field of Classification Search
  USPC .................. 138/112, 113, 114, 148, 149
  See application file for complete search history.

(56) References Cited

U.S. PATENT DOCUMENTS

| | | | |
|---|---|---|---|
| 2,361,383 | A | 10/1944 | Coffman |
| 2,613,166 | A | 10/1952 | Gronemeyer |
| 3,379,221 | A * | 4/1968 | Harry ................ F16L 9/18 428/117 |
| 3,945,215 | A | 3/1976 | Johnson et al. |
| 4,621,838 | A | 11/1986 | Kneidel et al. |
| 4,791,953 | A | 12/1988 | Berchem |
| 4,849,274 | A * | 7/1989 | Cornelison .......... F01N 3/0218 428/116 |
| 5,350,011 | A | 9/1994 | Sylvester |
| 6,220,079 | B1 | 4/2001 | Taylor |
| 6,575,197 | B2 | 6/2003 | Esser |
| 6,634,388 | B1 | 10/2003 | Taylor et al. |
| 6,959,916 | B2 | 11/2005 | Chigasaki et al. |
| 7,017,604 | B2 | 3/2006 | Newberg |
| RE39,521 | E * | 3/2007 | Herrington ............... F16L 9/19 242/613.5 |
| 8,783,279 | B2 | 7/2014 | Williams, Jr. et al. |
| 2004/0187946 | A1* | 9/2004 | Herrington .......... B29C 48/355 138/112 |
| 2010/0071798 | A1 | 3/2010 | Tsapatsaris et al. |
| 2010/0287957 | A1* | 11/2010 | Liu ........................ F16L 7/00 62/50.7 |
| 2017/0129052 | A1 | 5/2017 | Buller et al. |
| 2018/0051834 | A1 | 2/2018 | Hofmann |
| 2018/0209322 | A1 | 7/2018 | Zhu et al. |

FOREIGN PATENT DOCUMENTS

| | | |
|---|---|---|
| CN | 209943625 | 1/2020 |
| DE | 3214918 | 11/1983 |
| EP | 1 046 423 | 10/2000 |

OTHER PUBLICATIONS

Clarke, David R. et al., "Thermal Barrier Coating Materials," Materialstoday, vol. 8, No. 6, Jun. 2005, pp. 22-29.

Dorf Ketal, Raising the Standard: Crude Preheat System Fouling Control, https://www.dorfketal.com/industry-solutions/refining/atmospheric-and-vacuum-distillation-units/pre-heat-exchanger-train, Accessed Sep. 23, 2020, 2 pp.

Frazier, William E., "Metal Additive Manufacturing: A Review,"Journal of Materials Engineering and Performance, vol. 23, No. 6, Jun. 2014, pp. 1917-1928.

Herzog, Dirk et al., "Additive Manufacturing of Metals," Acta Materialia, vol. 117, 2016, pp. 371-392.

"Inconel," ChemEurope, [Online]. Available: http://www.chemeurope.com/en/encyclopedia/Inconel.html. [Accessed Aug. 22, 2018], 2 pp.

International Search Report dated Jun. 18, 2020 issued in PCT International Patent Application No. PCT/IB/2020/052256, 12 pp.

Jia, Qingbo et al., "Selective Laser Melting Additive Manufacturing of Inconel 718 Superalloy Parts: Densification, Microstructure and Properties," Journal of Alloys and Compounds, vol. 585, 2014, pp. 713-721.

Jones, R. L., "Thermal barrier coatings," Metallurgical and Ceramic Protective Coatings, 1996, pp. 194-235.

LC-Fining/LC-Max, LC-FINING / LC-MAX- CLG (Chevron Lummus Global)—MDR, Bottom of the Barrel Upgrading, printed on Jan. 13, 2020 from https://www.mcdermott.com/CLG/Bottom-of-the-Barrel-Upgrading/LC-MAX-LC-FINING, 2 pp.

MOGAS Patents Thermal Sleeve, Solves Premature Stress Cracking, MOGAS Industries | Severe Service Ball Valves | Houston, Texas. [Online]. Available: https://www.mogas.com/es-mx/company/news/2016/mogas-patents-thermal-sleeve. [Accessed: Aug. 27, 2018], 3 pp.

Motyka, Elaine, Protective Coatings Extend Valve Life in Sever Service Conditions, Materials & Manufacturing, www.valye-world.net, Sep. 2014, 3 pp.

"Overview of Thermal Fatigue," Inspectioneering, [Online]. Available from https://inspectioneering.com/tag/thermalfatigue. Accessed Aug. 22, 2018, 1 page.

Pontarollo, Alberto et al., Characterisation of Inconel 625 Coatings Deposted by Cold Spray, Conference Paper, ResearchGate, vol. 1, No. 1, Sep. 2011, Uploaded from https://www.researchgate.net/publication/289522915 on Jan. 7, 2016, 6 pp.

The Benefits of Finite Element Analysis in Manufacturing, Manor Tool & Manufacturing Company, [Online]. Available: https://www.manortool.com/finite-element-analysis. [Accessed Aug. 22, 2018], 5 pp.

Velan, Ebullated Bed Valve Solutions, 2019, 8 pp.

Velan, "Our heritage," Velan. [Online]. Available: https://www.velan.com/en/company/our_heritage, Accessed: Aug. 27, 2018, 4 pp.

Why Choosing Inconel 718 for Aerospace Additive Manufacturing?, Farinia Group, [Online]. Available: https://www.farinia.com/additive-manufacturing/3d-materials/inconel-718-aerospace-additive-manufacturing. [Accessed Aug. 22, 2018].

* cited by examiner

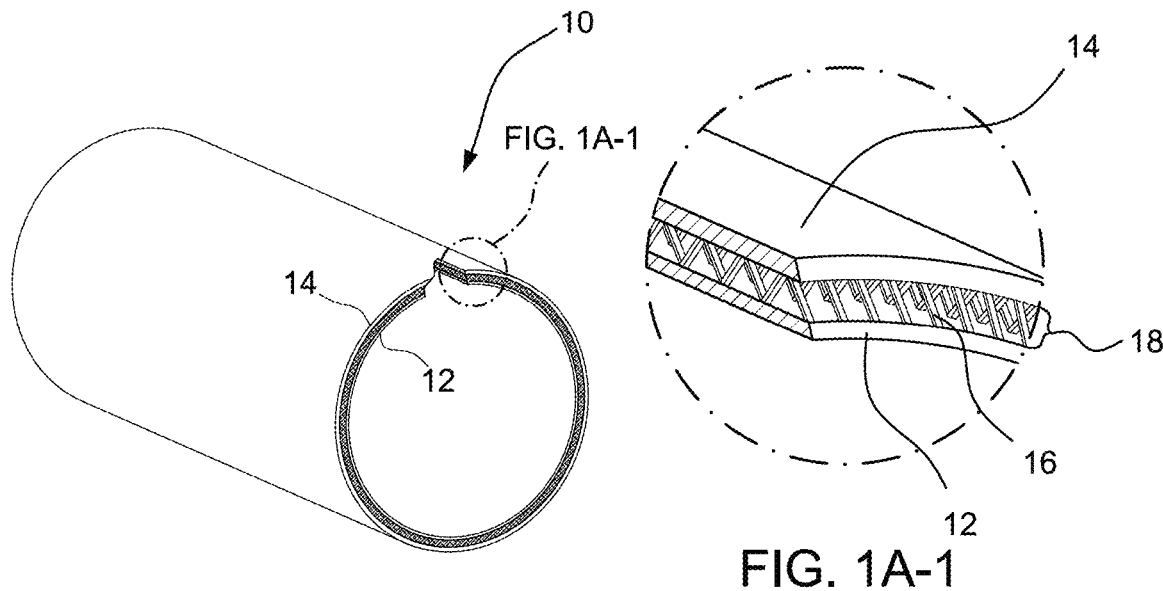
FIG. 1A
FIG. 1A-1
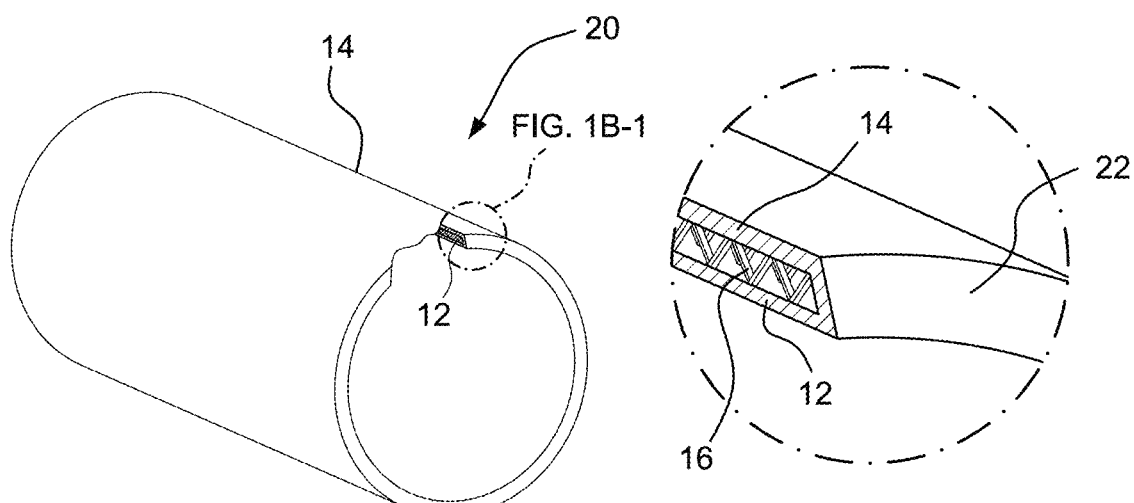
FIG. 1B
FIG. 1B-1

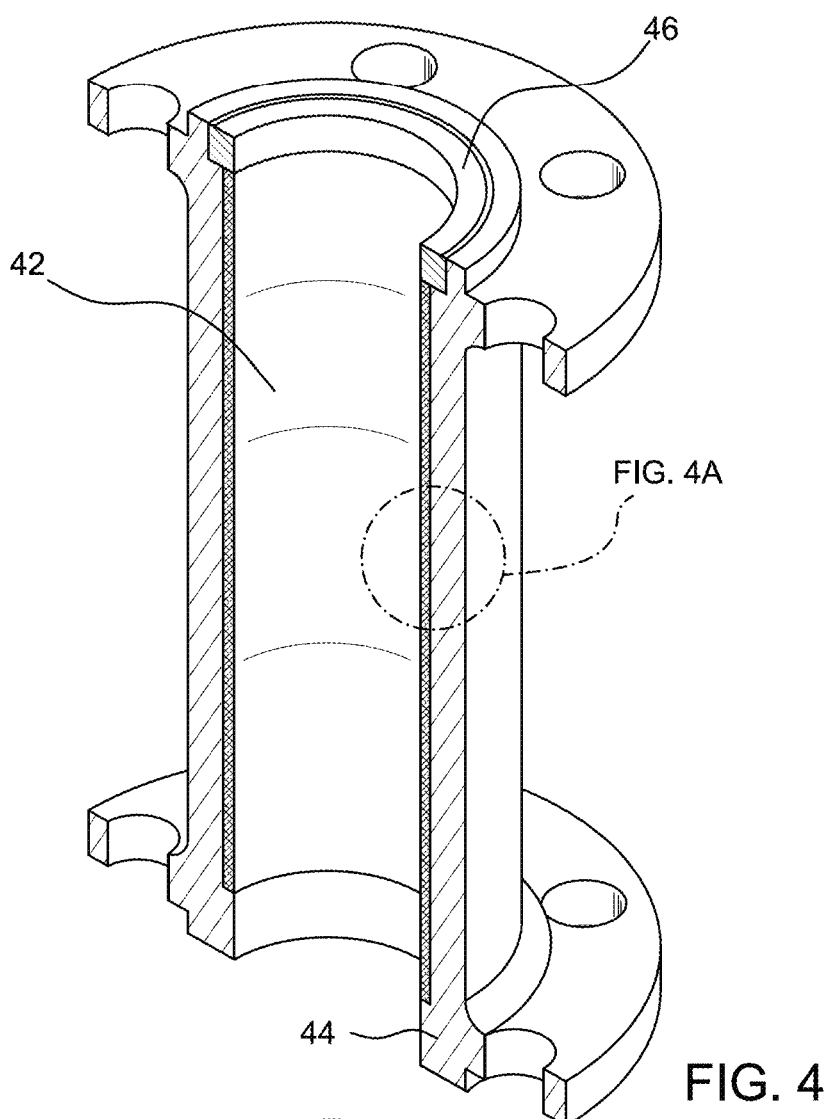
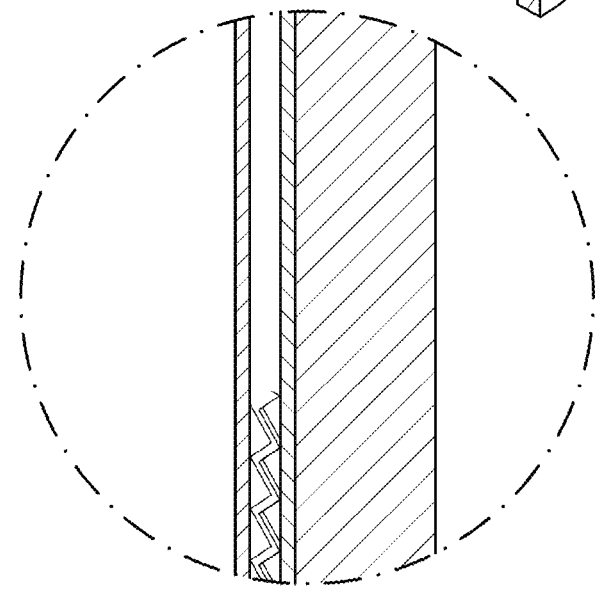
FIG. 4
FIG. 4A

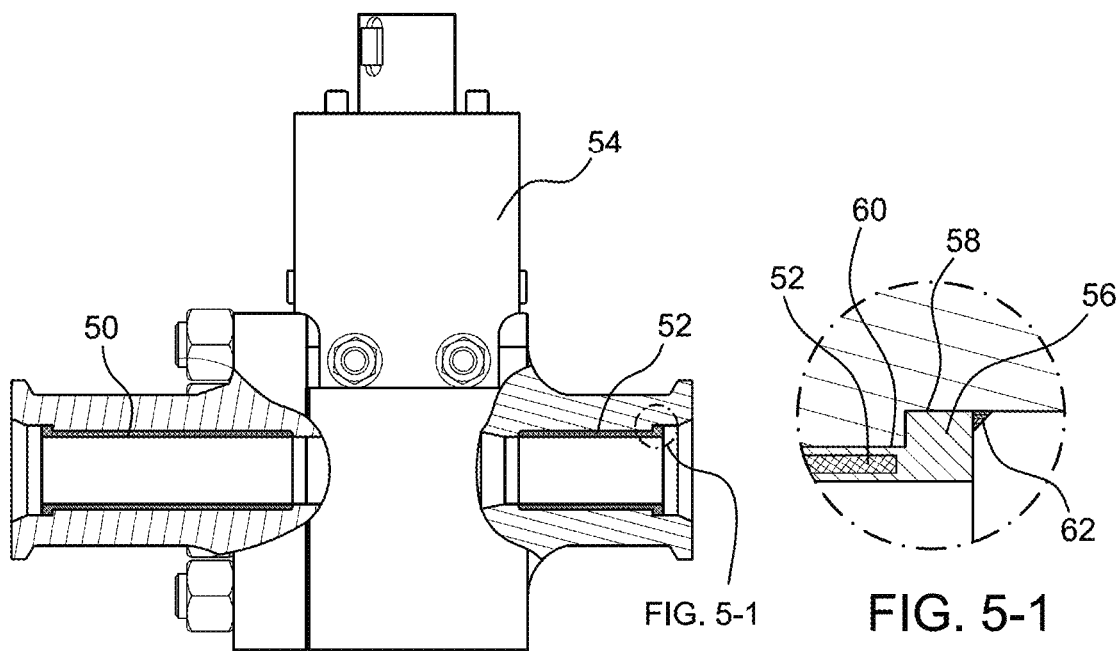
FIG. 5
FIG. 5-1
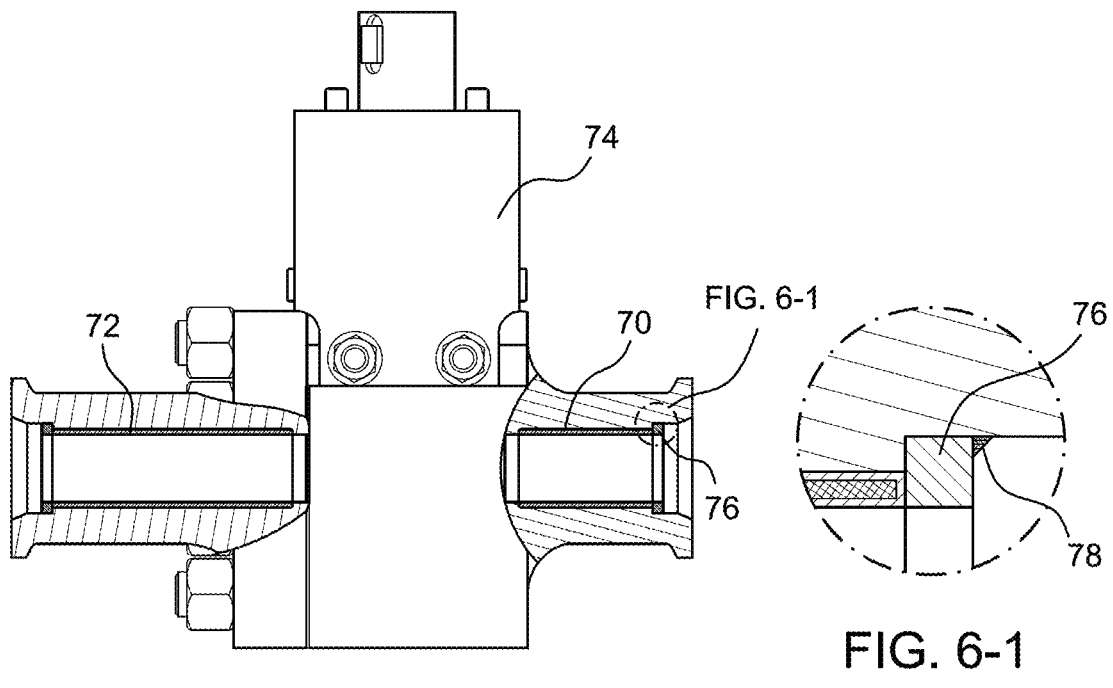
FIG. 6
FIG. 6-1

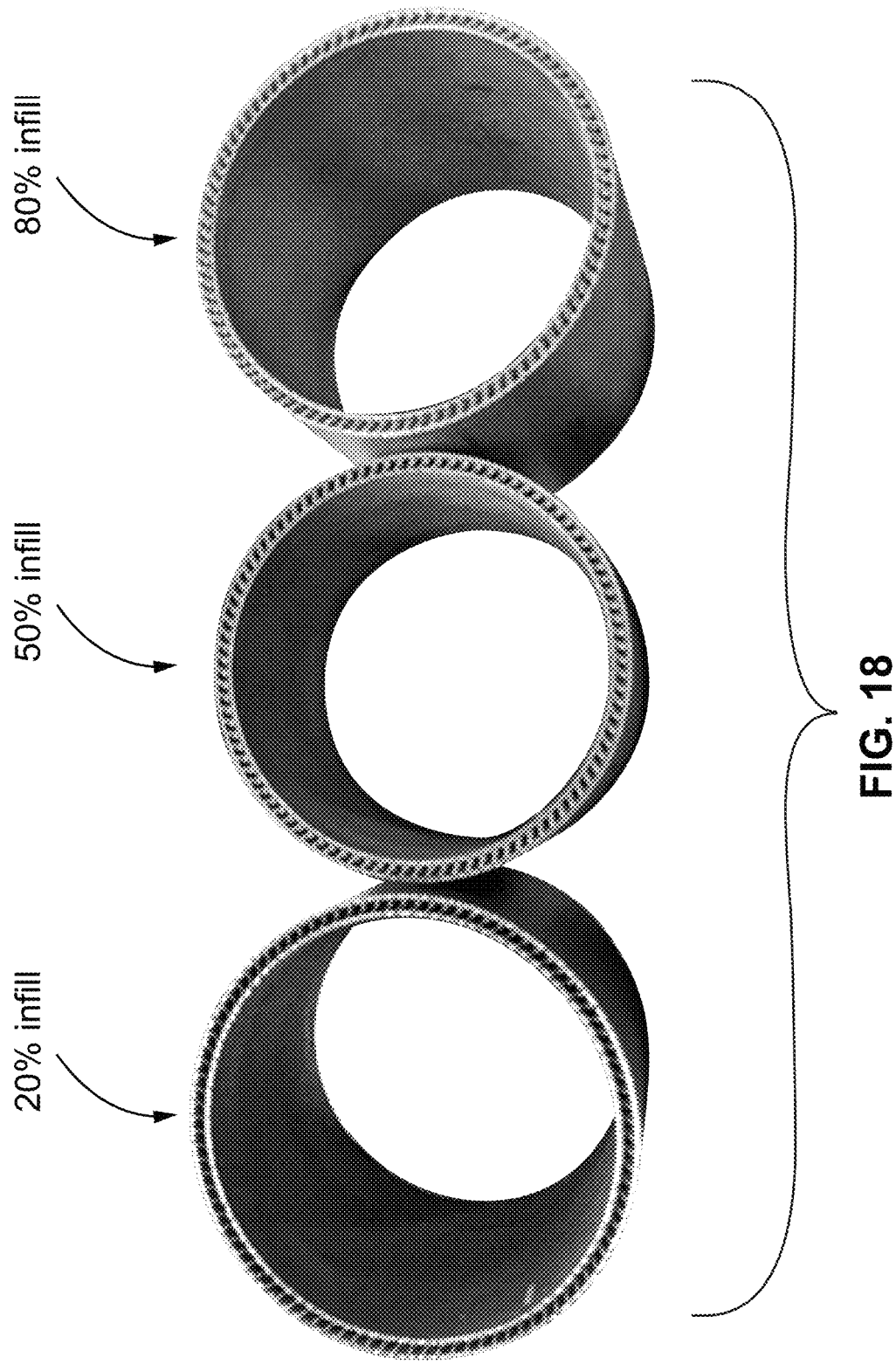

_US 11,940,084 B2_

THERMAL INSULATING SLEEVE LINER FOR FLUID FLOW DEVICE AND FLUID FLOW DEVICE INCORPORATING SUCH LINER

CROSS-REFERENCES TO RELATED APPLICATIONS

This continuation-in-part (CIP) application claims priority benefits under 35 USC § 120 to parent application PCT/IB2020/052256 (designating the US and thus a non-provisional US application pursuant to 35 USC § 363) filed Mar. 12, 2020 which also claims the benefit of grand-parent U.S. Provisional Patent Application No. 62/823,357, filed Mar. 25, 2019, the entire contents of both parent and grandparent applications being herein and hereby incorporated by reference.

STATEMENT REGARDING FEDERALLY SPONSORED RESEARCH OR DEVELOPMENT (NOT APPLICABLE)

BACKGROUND & SUMMARY

Fluid flow devices (e.g., pipes, valves, nozzles and the like) subjected to thermal shocks in severe industrial applications can benefit from thermal protection to reduce thermal stresses, mitigate the effects of thermal shock experienced and prevent premature thermal fatigue. Fluid flow devices subject to cyclic high pressure and temperature changes make them prone to failure due to thermal shock. Thermal shock refers to a process wherein the flow device experiences sudden large magnitude changes in thermal stress when the heat flux and temperature gradient experienced by the flow device change abruptly.

Thermal shock damage can be found in various severe service industries (e.g., in a catalyst injection valve and its connection pipes in an ebullated bed hydro-processing ore refining application). In the case of an ebullated bed hydro-processing system, for instance, cracking of valve body and metal valve seats has been observed when valves are exposed to temperatures and pressures of up to 850° F. and 3,500 psi at 4-10 cycles per day. Cracking is thought to occur due to initial thermal stresses experienced when the valve is opened to experience such high temperature and pressure after several hours of having remained closed and therefore having reached ambient temperature. This phenomenon is especially observed during winter when external ambient temperature drops (e.g., to as low as −40° F.) and pre-heating systems fail.

Over the years, several innovations have been presented to help mitigate the effects of temperature surges and, in some cases, proposed solutions have been adopted. Some of the attempted solutions currently in use include use of materials having low thermal conductivity, use of pre-heating systems, use of thermal barrier coatings which are highly refractive, etc. While these attempted solutions have achieved some level of success, they continue to present shortcomings which are here addressed by several example embodiments of improved thermal insulating sleeve liners for fluid flow devices used in severe industrial applications.

Pre-heating systems have proven to be unreliable. There are reported cases where pre-heating systems malfunctioned and resulted in valve operations being carried out without pre-heating. Cracking of the valve body is especially observed when this occurs, and regular maintenance is required to avoid such incidents. This may be costly but even then normal operation is not guaranteed, especially during harsh weather conditions.

Adoption of low thermal conductivity materials has been proven not as effective since cracking could still be observed on the bodies of flow devices. This is a clear indication of their susceptibility to extreme cyclic temperatures. This led to the adoption of thermal barrier coatings (TBCs). While TBCs have generally been more effective in providing thermal shock protection, they too have several limitations. TBCs are susceptible to erosion and corrosion, especially in instances where they are in the flow path. TBCs require laborious and expensive processes for their preparation which results in high initial costs. And TBCs are notoriously brittle and prone to cracking, corrosion and erosion. Sleeves with TBCs need to be frequently replaced.

Some non-exhaustive examples of prior thermally insulating sleeve liners or other thermally protective internal interfaces for fluid flow devices can be found, for example, in the following prior published US patent documents: Newberg U.S. Pat. No. 7,017,604; Williams, Jr., et al. U.S. Pat. No. 8,783,279; Hofmann US 2018/0051834; and Zhu et al. US 2018/0209322.

The present document describes an improved, preferably additively manufactured (e.g., by 3D printing), thermal insulating sleeve liner constructed of a suitable material for the serviced application (e.g., Inconel 718® or other austenitic nickel-chromium-based super-alloys, high nickel alloys and the like or ceramic and/or composite materials of various types recognized by those in the art as being suitable for certain severe service applications) with an internal infill structural pattern creating internal voids which increase thermal insulation properties while yet remaining structurally adequate to serve as a thermal insulating flow device liner for the serviced application. Preferably the infill is sized to maximize strength (i.e., to support internal/external pressures to be experienced by the sleeve) while concurrently also minimizing heat transfer (i.e., from the inside to the outside of the sleeve). Multi-layer material could also be used if the sleeve is made with wear-resistant, corrosion-resistant, low thermal conductivity materials. When a 3D printed sleeve comes out of the printer, it is in a green state. Subsequently parts can be subjected to hot isostatic pressing (sometimes referred to as being "hipped") and/or heat treated to reduce porosity and increase mechanical properties respectively. Based on testing, all these three states are believed to work.

An object of example embodiments described herein is to provide a thermal protection device with varying designs based on the method of manufacture and intended application.

In one example embodiment, an additively manufactured (i.e., 3D printed) thermal sleeve includes two spaced-apart cylindrical shells and an internal infill pattern of integrally-formed supporting structure there-between. This thermally insulating sleeve is fitted into the flow path of the protected flow device (e.g., valves, pipes and the like). The sleeve could be locked by an interference fit with the body. Other locking methods such as brazing, welding or one or more retaining rings could be considered as well. The infill may have variable patterns that may be in the form of, but not limited to, centroidally-directed lattices, hollow honeycomb-like structures and so forth. These patterns form a porous network of supporting structure containing voids between the two shells. This network of structure entraps air (or other insulating material such as an inert nitrogen gas or an insulating vacuum) thus allowing for heavy internal insulation of flow devices to prevent or reduce thermal shock therein. Tessellations or other structural patterns inside the sleeve allow for free design of infill percentage making it customizable depending on process requirements and parameters. The end of the sleeve may be left open or fused. For sleeves having fused ends, the air-tight infill patterned region or chamber can be vacuumed or pressurized (e.g., with air or an inert gas).

In another example embodiment, a pressure equilibrium hole can be made on or through the sleeve. While the sleeve can remain acting as if a solid air-tight structure, the pressure equilibrium hole ensures a pressure balance between its inner and outer surfaces.

In another example embodiment, a non-encapsulated thermal sleeve is slip-fitted into a flow device bore. This sleeve can have variable exterior protruding surface patterns which can change depending on process requirements. Examples of these may include axially ribbed or radially ribbed exterior protruding surface patterns. Exterior surface patterns reduce the surface area in thermal contact with the interior bore body of the flow device while still allowing air entrapment there-within. This device is preferably additively manufactured (e.g., by 3D printing) although some embodiments may be manufactured by other processes. Depending on the application, the thermal sleeve may have a wear and abrasion resistant layer on its inner surface. Such functional graded layers can be deposited either by conventional deposition methods (such as a spray of thermal material) or by additive manufacturing (i.e., 3D printing) processes.

For an example embodiment installed in a flow device, the different sleeve concepts may be capped (e.g., using a separate circumferential ring-shaped cap structure) or they may have an integrally-formed circumferential ring-shaped lip in other embodiments to secure and/or locate the sleeve within the flow device. The lipped sleeve may be produced as a single piece while the capped sleeve has two distinct parts: the main sleeve part and the securing cap part. The lip or cap can interact with a larger diameter bore section at a proximal end of the main sleeve part and a narrower diameter bore section at the other distal end of the main sleeve part (so as to locate and trap the main sleeve part at a desired location within the flow device bore). The cap may be of the same material as the sleeve or of the same or similar material as the flow device. The securing cap can be welded to the flow device on the proximal larger diameter bore section after the main sleeve part has been snug-fit into a main bore length against the end face of a smaller diameter distal bore section thus retaining the main sleeve part at a desired location. The lip of a lipped sleeve, if that is used instead of a separate cap ring, can be similarly welded directly to the body of the flow device at the larger diameter proximal bore section to retain the sleeve at a desired location.

Some example embodiments of an improved additively manufactured thermal insulating sleeve liner are sized to have an outside dimension and surface area purposefully smaller than the inside dimension and surface area of the protected flow device, thereby reducing sleeve liner thermal contact with the protected flow device and thus enhancing its thermal protection. Dimensions should provide the loosest possible fit so long as it does not permit or cause excessive vibration or permit ingress of thermally conductive material in use. In some embodiments, a loose fit clearance of a few thousands of an inch (e.g., on the order of 0.002 inch) may be suitable.

Some example embodiments of the improved additively manufactured thermal insulating sleeve liner may include spaced-apart external (i.e., outwardly protruding) structures to insure less thermal contact with the internal surface of a protected flow device thus further reducing sleeve liner thermal contact with the protected flow device and enhancing its thermal protection.

Some example embodiments of the improved additively manufactured thermal insulating sleeve liner may include an integrally formed larger diameter lip at one end to assist in locating and/or retaining the sleeve liner properly within the protected flow device. Such a locating/retaining end lip (e.g., a diameter larger than the main sleeve liner body to retain a respectively associated end at a proper location in use) may also be formed as a separate retaining cap-ring structure that is secured (e.g., by a few tack or seal welds) at a proper location within the protected flow device.

Some example embodiments of the improved additively manufactured thermal insulating sleeve liner are installed within a protected flow device so as to provide an integrated flow device product incorporating the improved thermal insulating sleeve. However in use, due to wear and/or other deterioration in use, it will likely be necessary to periodically remove the thermal insulating sleeve (e.g., by breaking spot or seal welds holding it in place) and replace it with a new or refurbished thermal insulating sleeve. And if a flow device is not initially provided with the improved additively manufactured thermal insulating sleeve, then one can be retro-fitted into the flow device to thereafter provide desired thermal protection.

The improved additively manufactured thermal insulating sleeve liner is preferably constructed so as to prevent ingress of thermally conductive materials (e.g., catalyst particles which may typically be on the order of 0.8-1.0 mm in diameter with active metal catalysts, fines, and/or coke) into internal voids of the insulating sleeve or between the outer sleeve surface and the internal surface of the protected flow device. In this way the thermal insulating and protective properties of the sleeve can be better maintained. At the same time, some pressure equalization may be needed, at least in some applications, between the inside and outside surfaces of the insulating sleeve (perhaps including internal voids of the sleeve). If a pressure equalization path is needed, care should be taken to keep the pressure equalization path(s) small enough to prevent ingress of flowing thermally conductive particles (e.g., metallic catalyst particles, fines and/or coke).

Some example embodiments of the additively manufactured thermal insulating sleeve liner have two solid shells sandwiching a concurrently formed additively manufactured infill pattern (i.e., manufactured by a conventional 3D printing process). The infill pattern may vary and may range from simple honeycomb structures to complex lattice structures depending on process requirements and parameters. The sleeve may have an open end, or the ends may be fused to make the sleeve airtight. In the case of an airtight sleeve, the infill pattern chamber voids may be vacuumed or pressurized.

Some example embodiments of the additively manufactured thermal insulating sleeve liner are non-encapsulated with variable patterns on the external sleeve surface that may be modified depending on the application.

Some example embodiments of the additively manufactured thermal insulating sleeve liner have a wear-resistant coating along the axial flow way.

Some example embodiments of the additively manufactured thermal insulating sleeve liner are trapped via a separate retaining cap or have an integral lip which in either case is welded to one end of the bore to be protected on the flow device (e.g., with spot welds or seal welds that can be easily broken when it is desired to remove/replace a previously installed insulating sleeve).

The example embodiments described herein offer several advantages. The additively manufactured (e.g., 3D printed) thermal insulating sleeve device is produced in one manufacturing step resulting in considerable savings. It requires little lead time as the design process is much shorter than other manufacturing methods. Validation of the parts can commence as soon as the part is printed. Since the device can be additively manufactured, unique and more complex structures can be made for the infill without interfering with sleeve integrity. Additionally, there is very little material wasted in an additive manufacturing process and a homogeneous density of the resulting insulating sleeve ensures a more evenly distributed sleeve strength.

To reduce the laborious procedure that would involve dis-assembly of the protected flow device during part replacement or planned plant maintenance, the present example embodiments are designed to be easily replaceable upon reaching the end of design life. This can be done by removing the flow device from the process and sliding the loosely fit sleeve out of the flow device bore (after light holding spot or seal welds are broken). Additionally, toughness of the material involved will ensure that the sleeve is more robust than in the past thus ensuring, among other things, less scrap and a potential for the sleeve material to be re-used.

BRIEF DESCRIPTION OF THE DRAWINGS

The accompanying drawings depict various example embodiments for illustrative purposes but are not to be construed as limiting the scope of later appended claims.

FIG. 1A is an isometric view of an example additively manufactured open-ended thermal insulating sleeve with an accompanying enlarged local section at FIG. 1A-1 to better depict an infill pattern sandwiched between two shells;

FIG. 1B is an isometric view of an example additively manufactured fuse-ended thermal insulating sleeve with an accompanying enlarged local section at FIG. 1B-1 to better depict the internal infill pattern as in FIG. 1A-1;

FIG. 4 is a schematic sectioned isometric view of an example capped thermal protection sleeve installed in a flanged flow device with an enlarged local section at FIG. 4A to better depict the internal infill pattern;

FIG. 5 is a schematic partially sectioned view of an example lipped thermal protection sleeve installed in a bore on a protected flow device and an accompanying enlarged partial sectional view at FIG. 5-1 to better illustrate how it is fitted into the bore;

FIG. 6 is a schematic partially sectioned view of an example capped thermal protection sleeve installed in the bores of a flow device and an accompanying enlarged partial sectional view at FIG. 6-1 to better illustrate how a capped sleeve is fitted into a bore;

FIG. 18 are open end views of three thermally protective sleeve examples having 20%, 50% and 80% infill patterns respectively (left to right).

DETAILED DESCRIPTION OF EXAMPLE NON-LIMITING EMBODIMENTS

Figures 1, 2A:
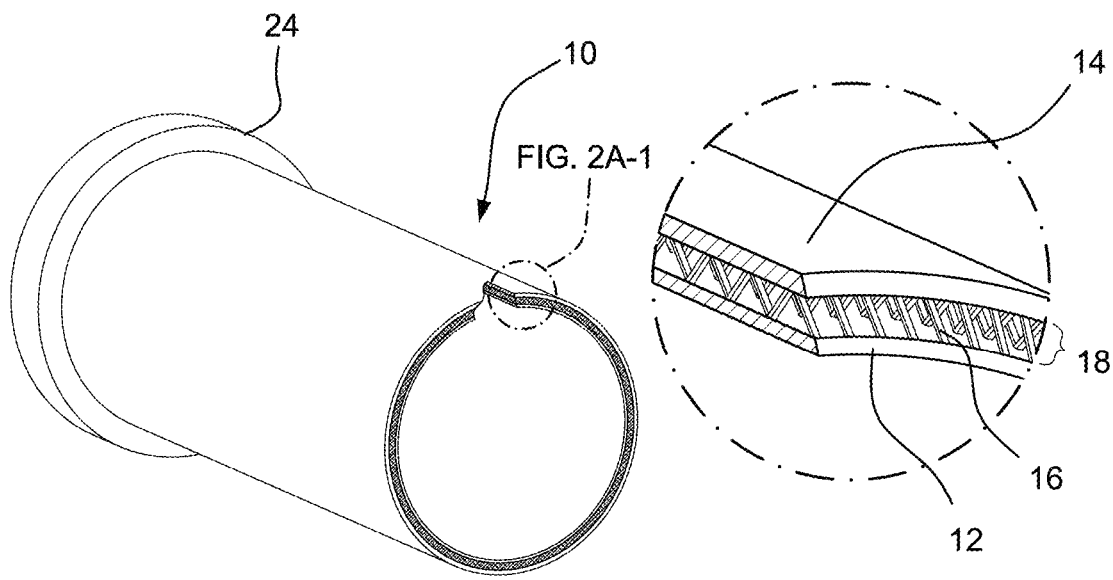
FIG. 2A is an isometric view of an example additively manufactured capped (or lipped) at one end and open-ended at the other end thermal insulating sleeve with an accompanying enlarged local section at FIG. 2A-1 to better depict an infill pattern sandwiched between two shells.

In the accompanying drawings identical reference numerals may have been used to identify features which are identical or similar in function. The example embodiments demonstrate varied designs based on similar concepts to provide an overall view of example thermal insulating sleeve liner interactions with flow devices.

FIG. 1A is a schematic isometric general overview of a thermal insulating sleeve 10 having an inner shell 12, outer shell 14, an infill pattern 16 of supporting structure with included voids provided between the inner and outer shells 12, 14, and open ends 18 (e.g., see FIG. 1A-1). The material and infill pattern 16 of the thermal sleeve can be varied to offer different strengths and thermal insulation depending on the application for which it is intended. As those in the art will appreciate, a typical ebullated bed hydro-processing application flow device conveys a corrosive liquid carrying small (e.g., 0.8-1.0 mm diameter) catalyst particles at temperatures on the order of 800-1,100° F. at a pressure on the order of 3,400 psi. In this application, as those in the art will appreciate, a thermal insulating sleeve liner could typically be made of high temperature alloy (e.g. nickel alloy). As those in the art will recognize, the material and structure of the thermal insulating sleeve liner must be chosen appropriately in accordance with conventional standard design practices to accommodate process parameters of the application being serviced. Such sleeve characteristics are typically determined by the extreme pressures and temperatures to which the sleeve will be subjected. The thermally insulating sleeve liner 10 can be slip-fit into a flow device bore. The open ends 18 should be fitted to mating internal surfaces of the flow device sufficiently closely to make it impossible for solid entrapment (e.g., of metallic thermally conductive catalyst particles) within the chamber of the infill pattern 16 or between the outer shell 14 and the inner surfaces of the flow device.

Complex lattice infill patterns 16 provide a longer and indirect path for thermal conduction while air (or other insulating material or vacuum) trapped in between the two shells due to interstices of the infill pattern 16 possesses poor thermal conduction properties leading to increased thermal insulation.

FIG. 1B is a schematic isometric general overview of a thermal insulating sleeve 20 having an inner shell 12, outer shell 14, an infill pattern 16 of supporting structure with included interstice voids provided between the inner and outer shells 12, 14, and fused ends 22 (i.e., closed ends 22 as depicted in FIG. 1B-1 so as to encapsulate the voids included within the infill structure 16 between shells 12, 14 and ends 22). As with the thermal sleeve 10 of FIGS. 1A and 1A-1, the material and infill pattern 16 of the thermal sleeve 20 can be varied to offer different strengths and thermal insulation depending on the application for which it is intended. Here the voids within the chamber containing infill pattern 16 can be vacuumed or pressurized before ends 22 are fused shut (e.g., one end can be left partially open and connected to a source of vacuum or pressurized thermally insulating gas or liquid fluid before this partial opening is also fused to a fully closed configuration). Once the voids are thus suitably treated and the ends 22 fused to a closed state, the thermally insulating sleeve liner 20 can be slip-fit into a flow device bore. The fused closed ends 22 make it impossible for solid entrapment (e.g., of metallic thermally conductive catalyst particles) within the chamber of the infill pattern 16. The fused ends 22 should be fitted to mating internal surfaces of the flow device sufficiently closely to make it impossible for solid entrapment (e.g., of metallic thermally conductive catalyst particles) between the outer shell 14 and the inner surfaces of the flow device.

While some prior art thermally insulating sleeve liners have been shrink-fitted into tight engagement with the internal walls of the flow device, it is preferred to only loosely slip-fit the thermally insulating sleeve liner 10 or 20 within the internal bore walls of the flow device so as to provide additional thermal insulation between a hot corrosive and erosive high pressure flowing substance and the flow device structures.

Figures 1, 2B:
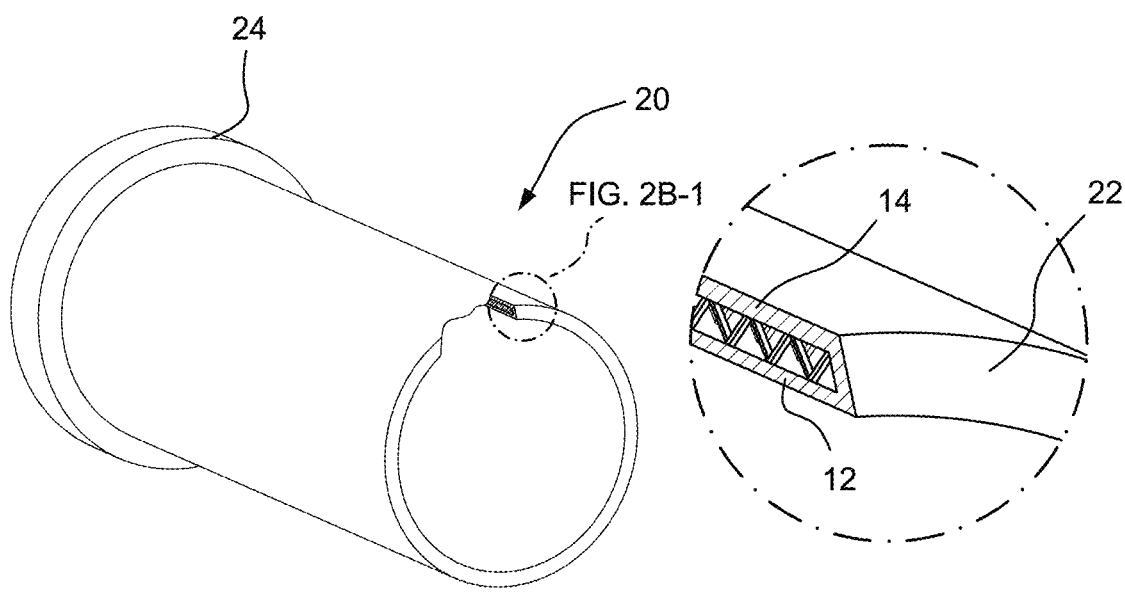
FIG. 2B is an isometric view of an example additively manufactured capped (or lipped) at one end and fused at the other end thermal insulating sleeve with an accompanying enlarged local section at FIG. 2B-1 to better depict the internal infill pattern as in FIG. 2A-1.

FIG. 2A and FIG. 2B depict the example thermal insulating sleeves 10 and 20, respectively, with an included securing cap or lip 24 at one end. A securing cap may be separately constructed and fitted at an end of the sleeve when installed within a flow device to secure it at a proper location in use within a flow device. A securing lip may be constructed as an integral part of the sleeve at an end to secure it at a proper location in use within a flow device.

Figure 3A:
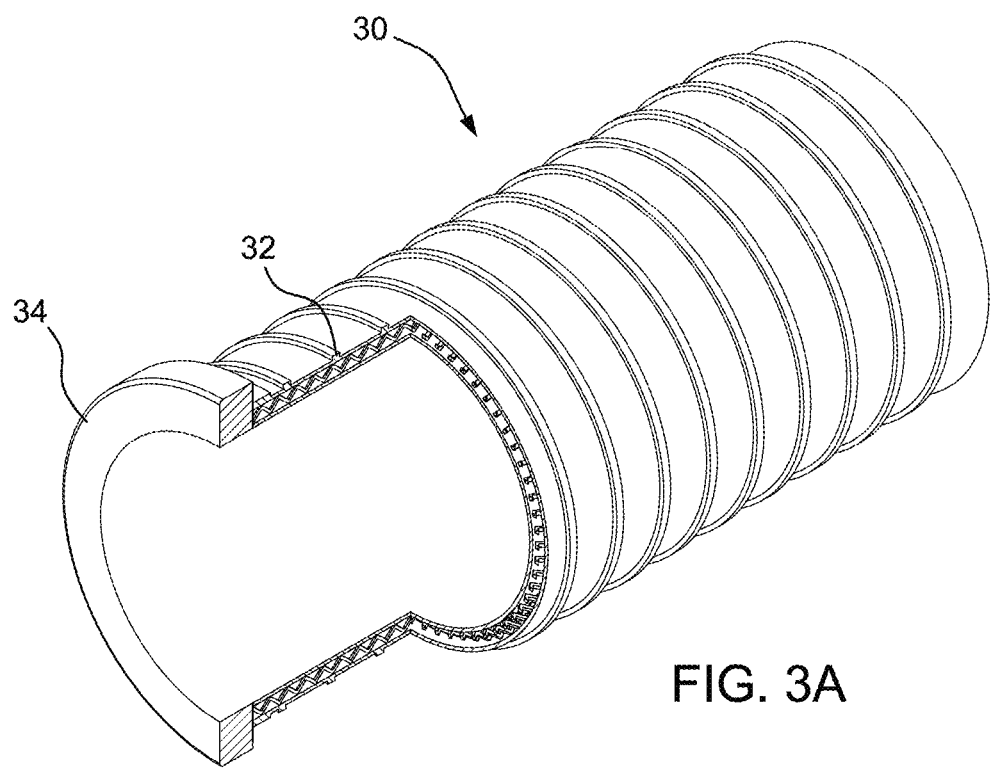
FIG. 3A is an isometric and partially sectioned view of an example capped and additively manufactured radially ribbed thermal insulating sleeve.

FIG. 3A depicts an example capped radially-ribbed thermally insulating sleeve liner 30. The externally extending interstices between ribs 32 will provide additional thermally insulating spaces when fitted within the internal surfaces of a flow device bore. Example sleeve liner 30 is preferably created by additive manufacturing (i.e., 3D printing) to provide a central portion of the sleeve body between inner and outer shells with an infill pattern as in the examples of FIGS. 1A, 1A-1, 1B, 1B-1, 2A, 2A-1, 2B, and 2B-1 to provide still further thermal insulation as in these earlier-described embodiments. The section cut highlights an end contact between the sleeve 30 and a separate securing cap 34 (which functions, like the securing cap of earlier-described embodiments). As those in the art will recognize, the securing cap 34 could be replaced by an integrally manufactured securing/locating lip if desired (as depicted in FIG. 3B).

Figure 3B:
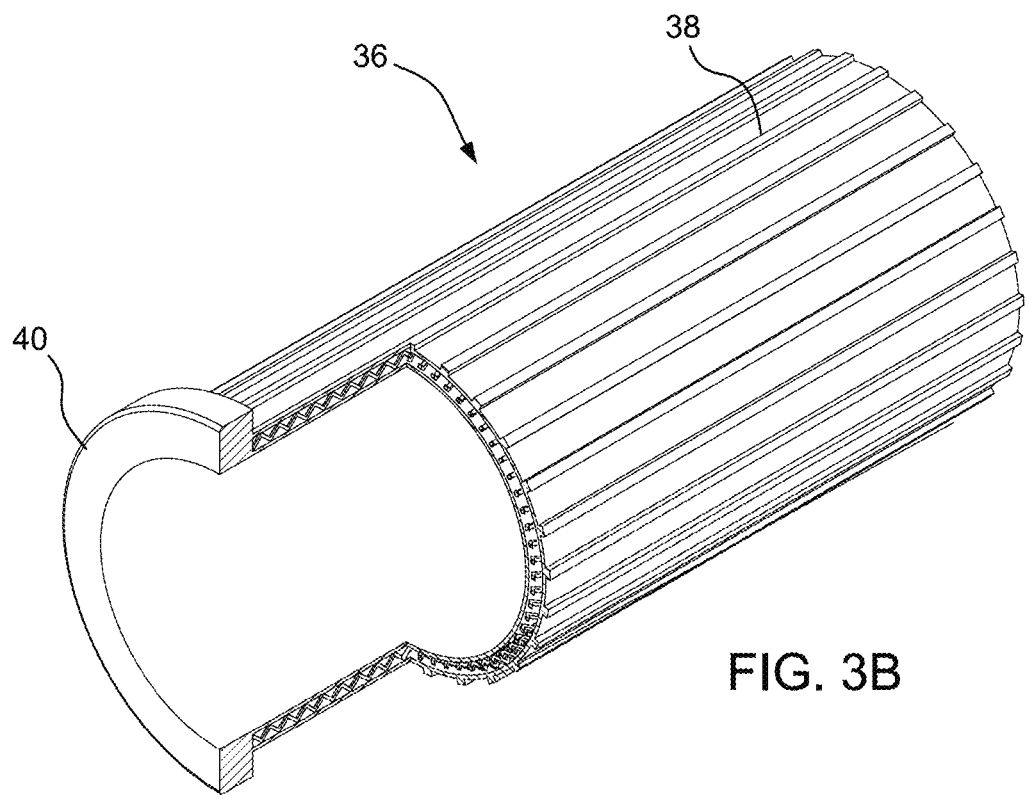
FIG. 3B is an isometric and partially sectioned view of an example lipped and additively manufactured axially ribbed thermal insulating sleeve.

FIG. 3B depicts an example lipped axially-ribbed thermally insulating sleeve liner 36. The externally extending interstices between ribs 38 provide thermally insulating spaces when fitted within the internal surfaces of a flow device bore. Example sleeve liner 36 is preferably created by additive manufacturing (i.e., 3D printing) to provide a central portion of the sleeve body between inner and outer shells with an infill pattern as in the examples of FIGS. 1A, 1A-1, 1B, 1B-1, 2A, 2A-1, 2B, 2B-1 to provide still further thermal insulation as in these earlier-described embodiments. The section cut highlights the integrally formed securing/locating lip 40 formed at an end of the sleeve 36 (which functions, like the locating/securing lip of earlier-described embodiments). As those in the art will recognize, the locating/securing lip 40 could be replaced by a separate securing/locating cap if desired (as depicted in FIG. 3A).

When disposed about an axial flow passage within a flow device bore (e.g., as shown in FIGS. 4-7), the externally ribbed sleeve 30 or 36 makes less surface contact with the flow device bores due to the surface pattern of ribs on its exterior thereby reducing thermal stress concentration points.

While FIGS. 3A and 3B illustrate two options of radially-ribbed and axially ribbed exterior surfaces, as those in the art will appreciate, the ribbed pattern can be modified as desired to accommodate requirements of various processes.

FIGS. 4 and 4-1 depict a capped thermal protection sleeve 42 installed in a flow device 44. The thermally insulating sleeve 42 (of any example embodiment described herein) can be disposed in a flow device (e.g., flanged pipe 44) detachably connectable to other flow devices (e.g., valves). The interaction between the sleeve 42 and the pipe 44 is like that between an example sleeve and the internal flow surfaces of other flow devices (e.g., valves). The example thermally insulating sleeve 42 is slip-fitted into a bore of the pipe body that has a smaller diameter end portion locating and closing (if the sleeve does not already have a closed end) one end of the sleeve 42 to the ingress of flowing thermally conducting materials in use. A securing cap 46, disposed within a larger diameter end portion of the flow device bore, secures and locates the other end of the thermal insulating sleeve 42 within the flow device bore (and closes it to ingress of flowing thermally conducting materials in use if the sleeve does not already have a closed end).

FIG. 5 depicts lipped thermal protective sleeves 50, 52 slip fitted into flanged pipe input/output ports of a valve 54. In an enlarged partial section view depicted at FIG. 5-1, the outer surfaces of integral securing/locating lip 56 of sleeve 52 is mated to a larger diameter proximal internal bore section 58 while the main body of sleeve 52 is slip-fit into the relatively narrower main bore 60 of the flow device valve 54—and the other end of sleeve 52 is butted to a narrower diameter distal bore section. The lip 58 is held in place during use by weld(s) 62 (e.g., spot or seal welds that can be easily broken when it is desired to remove/replace the sleeve 52).

As those in the art should now appreciate, the general installation overview of FIGS. 5 and 5-1 also can be used for a capped thermal protective sleeve (with open or fused ends and a separate locating/securing cap at the proximal end). As such, the arrangement of FIG. 5 can be used for all lipped or capped sleeve example embodiments. This includes the radially ribbed, axially ribbed, the in-filled lattice sleeves of FIGS. 1A, 1B, 2A, 2B and so forth whether capped or lipped.

FIG. 6 illustrates capped thermal protective sleeves 70, 72 slip fitted within the bores of a flow device (e.g., the flanged input/output pipes of a valve 74). Like the lipped sleeve of FIG. 5, this arrangement applies in general to all example thermally insulating sleeves. The sleeves 70, 72 are fitted into the flow device 74 just like sleeves 50, 52 are fitted into the flow device 54. However, as depicted in the enlarged view at FIG. 5-1, since a separate securing cap 76 is now employed (instead of the integral lip 56 in FIG. 5), the securing cap 76 is held in place during use by weld(s) 78 (e.g., spot or seal welds that can be easily broken) while the distal other end of a sleeve is located against a smaller diameter bore section at the opposite distal end of the flow device bore (with a sufficiently small clearance fit to prevent ingress of thermally conductive material during use). This arrangement holds for all capped or lipped sleeve example embodiments. This includes the radially ribbed, axially ribbed, the in-filled lattice sleeves of FIGS. 1A, 1B, 2A, 2B and so forth whether capped or lipped.

Figure 7:
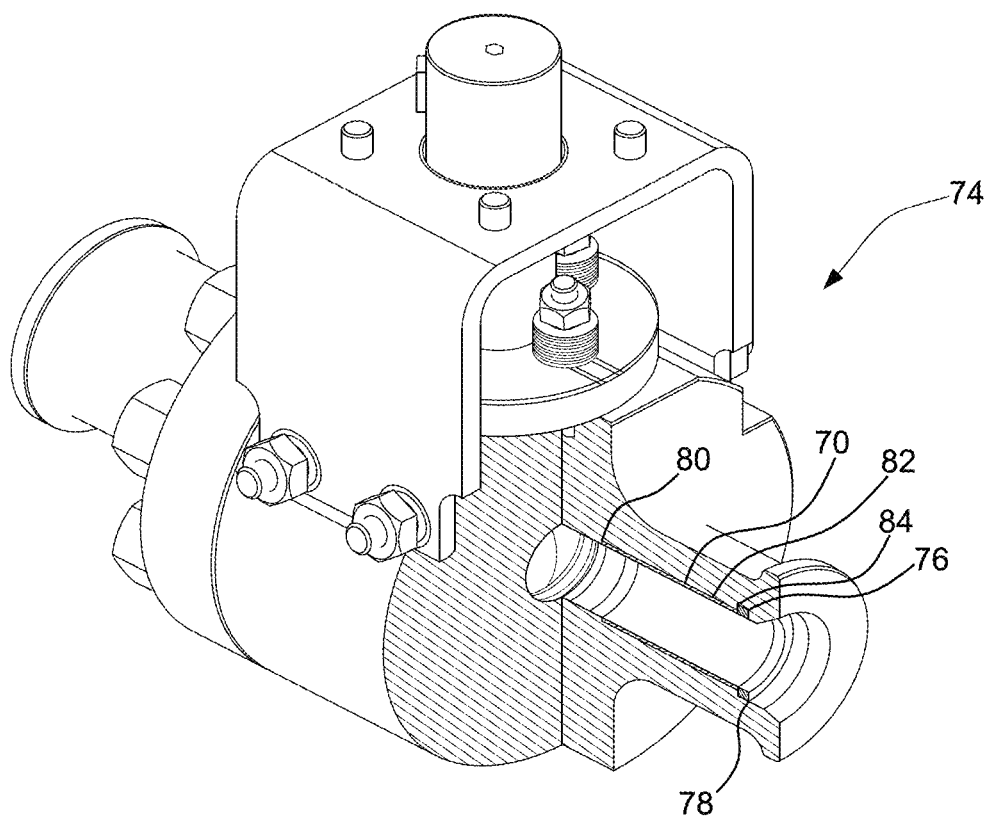
FIG. 7 is a schematic partially sectioned isometric view of a valve flow device having two flanged end connection pipes with installed thermal protection sleeves there-within.

FIG. 7 is a cut-away schematic isometric view of valve 74 in FIG. 6 showing sleeve 70 having its distal end butted to a smaller diameter distal end 80 of flow device bore 82 and trapped there by the larger diameter cap 76 within larger diameter proximal bore 84 by weld(s) 78.

To establish some measure of efficiency for an example embodiment, a 3-dimensional finite element analysis using a transient thermal technique was conducted for a ball valve having a flanged end connector inside diameter of 2.3 inches and an outside diameter of 4.5 inches, subjected to extreme temperature and pressure cycles (e.g., cycles were from atmospheric pressure at ambient temperature to 2,030.5 psi at 752 F). Three different configurations were used: the flow device without any thermal protective device; the flow device with the internal surface that interacts with the axial flow path coated with thermal and wear resistant materials; and the flow device with a thermal protective sleeve as shown in FIGS. 5-6. The thermal protective sleeve was made of Inconel 718® by conventional 3D printing processes.

Peak stress intensities in the end connectors was found to be 605 MPa for the flow device without any thermal protective technology, 511 MPa for the model with the thermal and wear-resistant coatings and 259 MPa for the model with a thermal protective sleeve of the type described herein. This translates to a design life of 1,800 cycles, 2,900 cycles and 40,000 cycles respectively from fatigue design curves using fatigue analysis based on American Society of Mechanical Engineers (ASME) criteria (i.e., ASME 2015 Boiler & Pressure Vessel Code Section II Part D and Section III A were used for the fatigue analysis).

Depending on the application, the interior surface of the example embodiments may be sprayed with a suitable wear-resistant coating as those in the art will appreciate.

The functionality of the example embodiments is not limited to any particular flow device as those in the art will appreciate.

Example thermal insulating sleeve liners for a fluid flow device provide a loosely-fit additively manufactured thermal protective sleeve disposed axially in bores of flow devices such valves and pipes. The sleeve may have variable designs depending on applications and may include, but are not limited to: (a) a sleeve made of an internal shell, an outer shell and an infill pattern; (b) a sleeve with radial ridges; (c) a sleeve that is ribbed axially—and wherein the infill lattice structures and exterior surface patterns may be modified to meet process parameters. Any of these examples may be lipped or capped depending on the preferred arrangement and/or weld.

An example thermal insulating sleeve liner structure having an internal shell, an outer shell and fused ends may have an airtight vacuumed infill chamber.

An example flow device fitted with an example thermal insulating sleeve liner may have an internal shell, an outer shell an infill chamber there-between with fused ends and a pressure equilibrium hole there-through.

An example thermal insulating sleeve liner structure may have an internal shell, outer shell, a pressurized infill chamber and seal-welded ends.

An example thermal insulating sleeve liner structure may be made of a high nickel alloy.

An example thermal insulating sleeve liner structure may have a wear-resistant coating on its inner surface of an internal shell.

An example thermal insulating sleeve liner structure may use a securing cap which may or may not be of the same material as the body of the flow device to which it is welded within a bore of the flow device. Alternatively, the securing cap may be threaded for a threaded connection with the bore of a flow device.

An example thermal insulating sleeve liner structure may include an integral lip welded to a bore on the body of the protected flow device.

Figure 8:
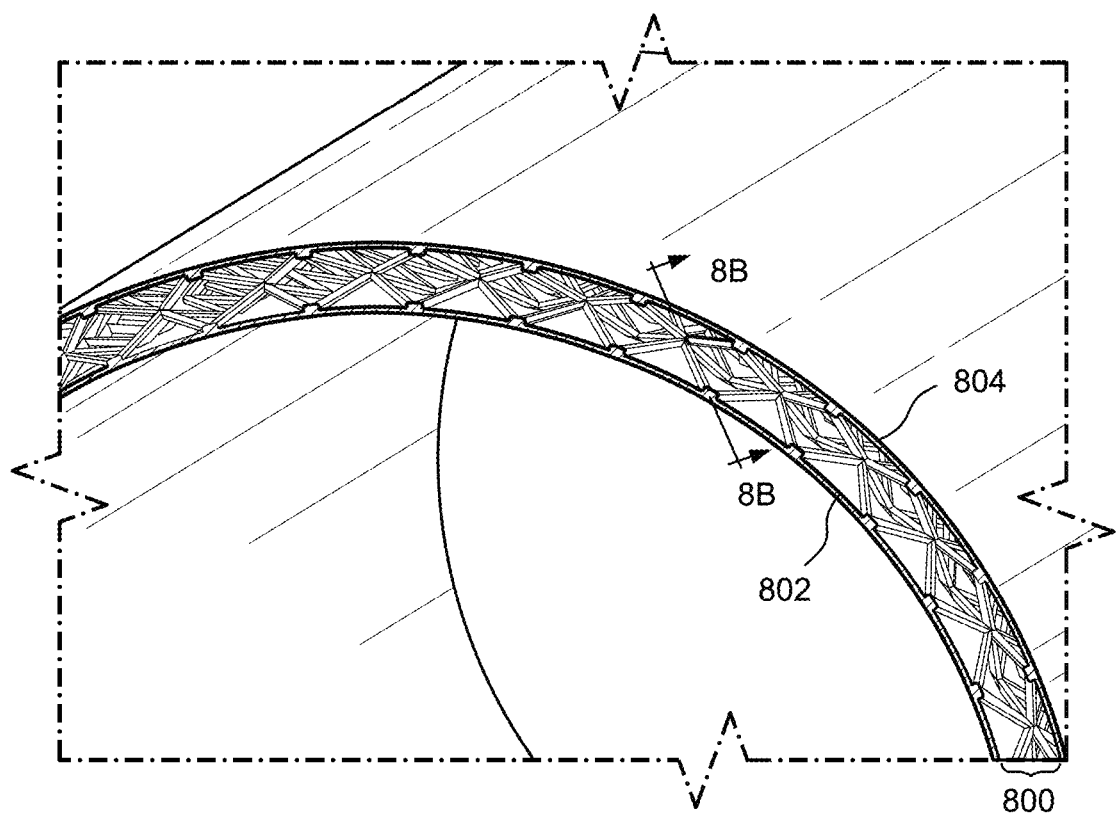
FIG. 8 is a cross-sectional view of an example embodiment of a thermal insulating sleeve liner having an infill pattern of tessellated support structures integrally formed by an additive manufacturing process with inner and outer shells, each support structure comprising four obliquely extending elongated members jointly intersecting mid-way between the inner and outer shells.

FIG. 8 is a 3D rendering of an example lattice infill 800 between inner sleeve 802 and outer sleeve 804. This example embodiment is to be additively manufactured (e.g., by 3D printing) from Inconel 718® metal and thus provide a unitary monolithic thermal insulating sleeve liner. As can be seen, the infill pattern 800 comprises tessellation of a basic infill pattern of four obliquely extending elongated solid cylindrical structures which mutually intersect midway between the inside surfaces of the inner and outer shells. As explained below, if the inner shell 802 and outer shell 804 are both solid, then an end is preferably left open (at least initially) so that any residue of metal powder can be extracted (e.g., before the end is closed, if desired, for completion of the manufacturing and/or installation process).

As previously mentioned, numerous different infill patterns are feasible for different applications (e.g., a honeycomb pattern, a corrugated infill similar to that used for cardboard boxes, bicycle wheel spokes, etc.). However for extreme temperature and pressures encountered by catalyst injection valves and connection pipes in ebullated bed hydro-processing ore refining applications, the infill pattern of FIG. 8 can provide suitable protection.

Figure 8A:
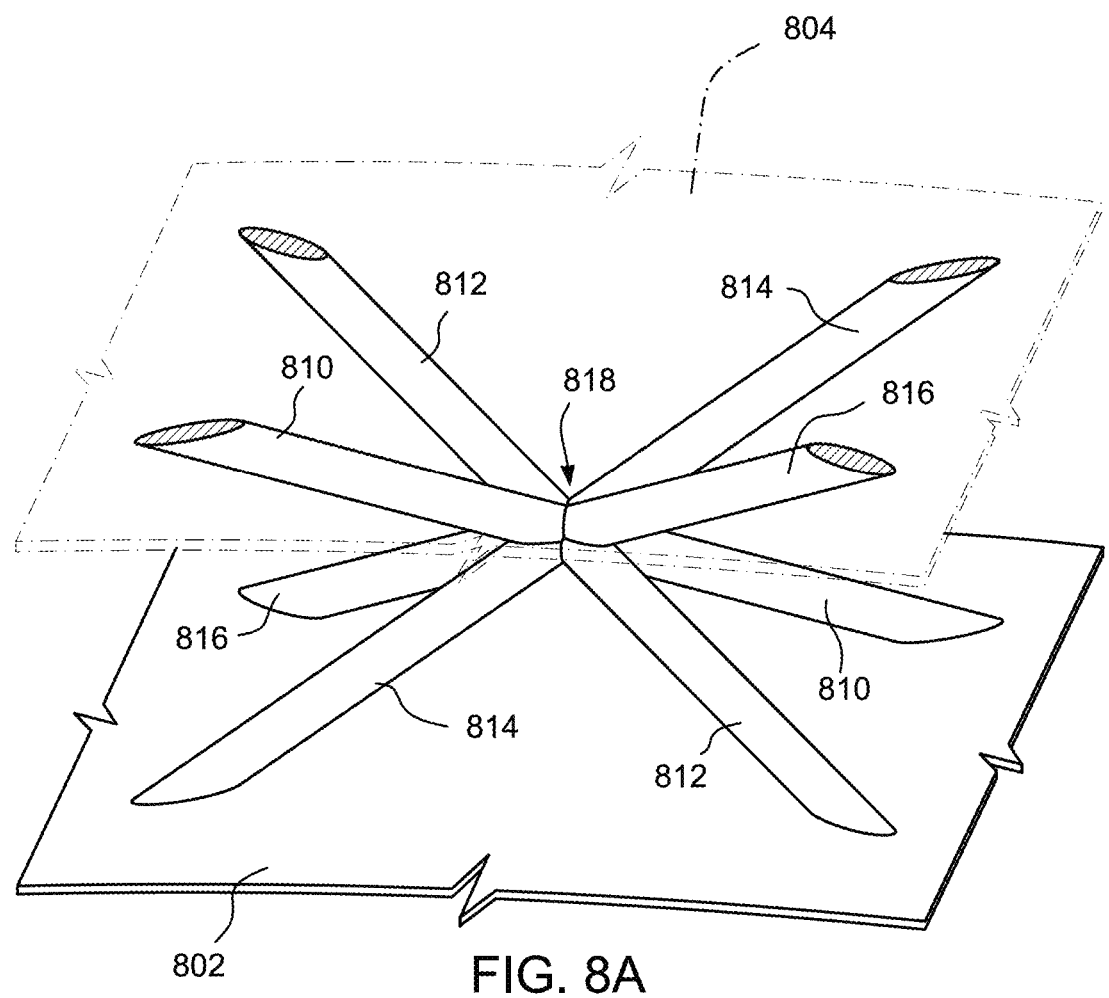
FIG. 8A is an expanded depiction of one of the 3D support structures tessellated between the inner and outer shells of the FIG. 8 insulating sleeve.

As will be appreciated from the FIG. 8A depiction of one of the base lattice infill 800 pattern structures, four small solid cylinders (810, 812, 814, and 816) mutually intersect with each other at 818 midway between the inside surfaces of the inner and outer shells 802, 804 and extend along edges of a pair of right square pyramids having a common vertex (at the mutual intersection point 818) pointed in opposite directions. That is, one of these pyramids has its vertex (opposite its square base formed by one of the liner shells) pointed "up" and the other of these pyramids has its vertex (opposite its square base formed by the other liner shell) pointed "down". This provides a strong compression resistant mutually cooperating pair of pyramidal supports between the inner and outer shells.

Figure 8B:
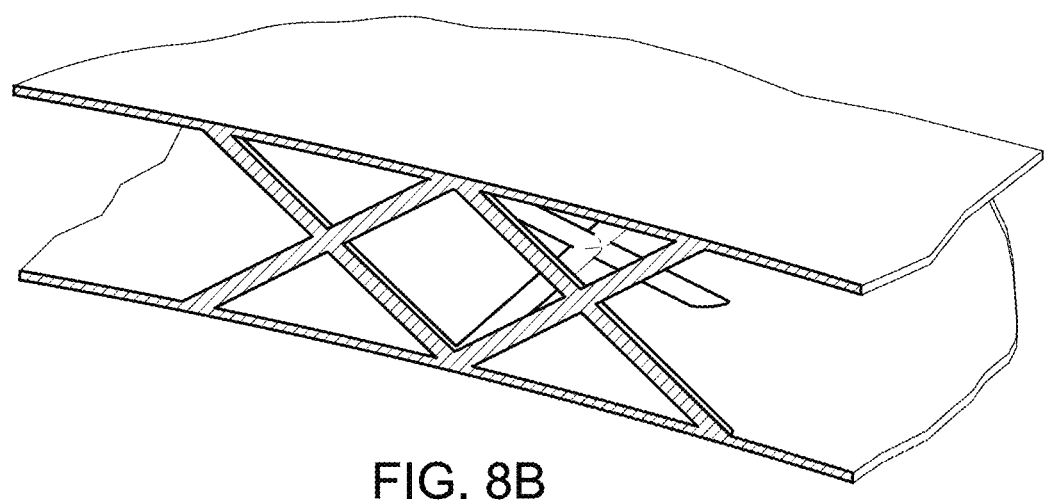
FIG. 8B is a schematic representation of a partial oblique cross section of the FIG. 8 insulating sleeve illustrating its monolithic metal structure due to manufacture by 3D printing so that the shells and support structures are all integrally formed into one single monolithic body.

As will be appreciated from the FIG. 8B oblique partial cross-sectional depiction of a portion of the FIG. 8 sleeve liner, because the sleeve is manufactured by an additive process (e.g., 3D printing), the resulting liner shells and support structures (including the obliquely extending elongated support structure cylinders) are created as a single monolithic one-piece metal structure.

In the example embodiment of FIG. 8, the volume of these small cylinders of the infill pattern 800 occupy only 20% of the total volume encompassed by the internally opposite facing cylindrical walls of the inner and outer cylindrical shells 802, 804. This relatively sparse filling reduces thermal conductivity while also possibly permitting some degree of flexibility to responsively cope with abrupt beginning and ending of very high pressure fluid flows through the liner.

Because the infill pattern 800 comprises oblique elongated support structures, the resulting obliquely disposed heat conduction paths between the inner and outer shells are lengthened thus increasing thermal insulating properties of the sleeve liner and improving its ability to provide thermal protection at higher temperatures. As will be noted, oblique elongated support structures are also found in the example embodiments of FIGS. 1A, 1A-1, 1B, 1B-1, 2A, 2A-1, 2B, 2B-1, 3A, 3B4, 4A5, 5-1, 6, 6-1 and 7.

Because the infill pattern 800 creates pyramidal support structures, the compression strength of the sleeve liner is improved so as to better withstand usage at higher pressures. Indeed, the example of FIG. 8 provides multiple mutually supporting pyramidal structures at each instance of the tessellated base support units shown in FIG. 8A.

In the example of FIG. 8, the radial dimension between the inner shell 802 and outer shell 804 is desirably as much as can be accommodated for a particular application. For example, if the inner diameter of the flow device to be protected is on the order of 2.5 inches, a radial dimension on the order of 0.13 inch can be accommodated in some instances while a radial dimension on the order of 0.063 inch might be all that is needed or practical in other instances. The tessellated support structures are uniformly distributed within this inner space and dimensioned so as to occupy approximately 20% of the volume between the inner and outer shells. The radial thickness of the outer shell 804 is less than that of the inner shell 802 so as to accommodate expected erosion of the inner shell when exposed to high pressure, high temperature, flow of highly corrosive catalyst flows (e.g., during catalyst injection for ebullated bed hydro-processing ore refining operations). For example, if the inner bore diameter of the flow device to be protected is on the order of 2.8 inches, the radial thickness of the outer shell 804 may be on the order of 0.03 inch in some instances while the radial thickness of the inner shell 802 may be on the order of 0.13 or 0.09 inch in other instances. As will be recognized, if the ratio of inner shell thickness to outer shell thickness is greater than one, substantial erosion of the inner shell 802 can be tolerated before replacement/refurbishment of the thermally protective sleeve is required. Preferably the thickness ratio is on the order of 2 or 3.

Figure 9:
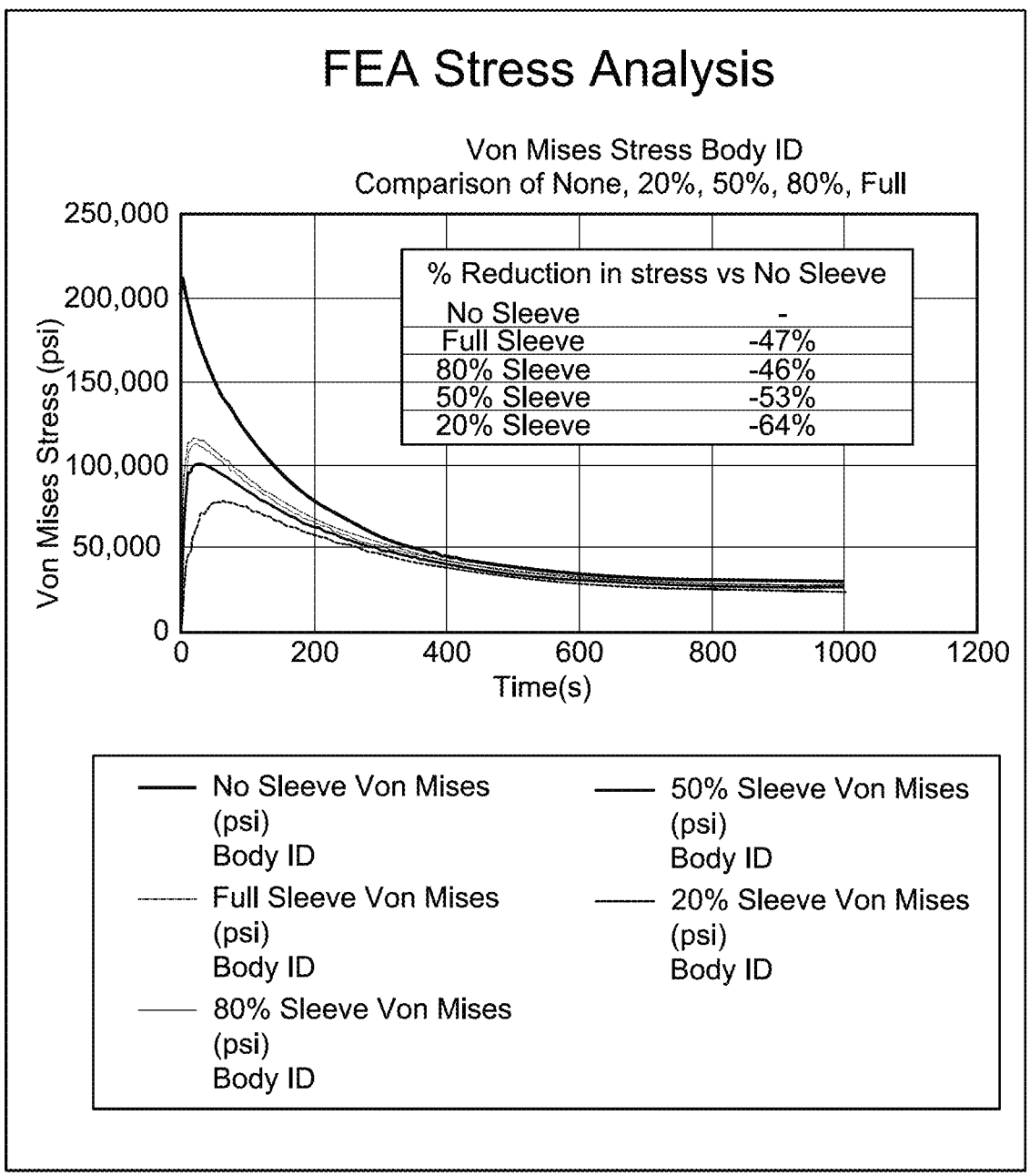
FIG. 9 provides a graphical depiction of simulation results comparing stresses imposed when the infill structures occupy different percentages of the volume between the inner and outer shells.

FIG. 9 provides graphical results of an FEA (finite element analysis) stress analysis for simulated infill patterns occupying different percentages of the volume defined by inner surfaces of the inner and outer shells. The graphs depict equivalent/Von-Mises stresses (psi) at the inside diameter of a sleeve as a function of time (depicted in time units of seconds) caused by thermal expansion after a simulated abrupt valve operation exposing the liner to a step function of incoming fluid at expected high temperature and pressure (e.g., up to approximately 3,500 psi and 850° F. in an ebullated bed environment). Example thermally insulating sleeves as described herein are configured to operate in high pressure environments of at least 1,000 psi—and preferably much higher as in ebullated bed applications.

As will be appreciated by those in the art, the lower stresses imposed with only 20% infill are a great improvement (while still not resulting in destructive damage to the sleeve liner, e.g., buckling)—thus permitting many more cycles of successful valve operation before expected failure of the sleeve liner. As will be appreciated, an only 20% infill pattern greatly reduces thermal conductivity between the inner and outer shells. It is possible that an even lower percentage infill can be used without failure (e.g., buckling) of the liner for some applications encountering lower pressures/temperatures. This may also be possible even for the very high pressures/temperatures encountered in ebullated bed hydro-processing applications. However prototype laboratory testing of an example embodiment with only 20% infill pattern has now been conducted successfully to demonstrate a 20% infill may be optimum.

Figure 10:
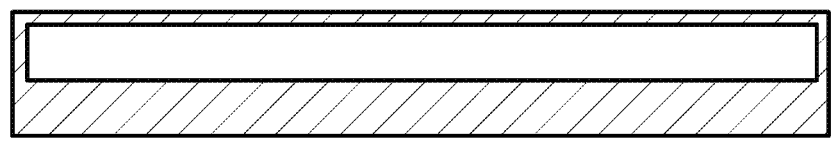
FIG. 10 is a cross sectional view of inner and outer shell dimensions with closed ends for one example embodiment (without depicting any infill pattern)

FIG. 10 provides a schematic partial cross section of an example sleeve liner having an overall axial length of 2.00 inches, an outside diameter of 2.573 inches, an inside diameter of 1.993 inches. As shown, the outer sleeve has a thickness of 0.03 inches while the inner sleeve has a thickness of 0.13 inches leaving an internal thickness of 0.13 inches for the desired integrally formed infill design.

Figure 11:
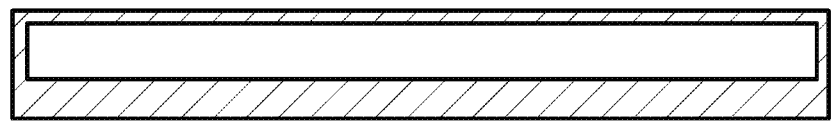
FIG. 11 is a cross sectional view of inner and outer shell dimensions with closes ends for another example embodiment (also without depicting any infill pattern)

FIG. 11 provides a schematic partial cross section of an example sleeve liner having the same dimensions as the example of FIG. 10 except for a slightly larger inside diameter of 2.073 inches and a slightly thinner inner shell thickness of 0.09 inches.

As is apparent from FIGS. 10 and 11, these example sleeve liners have different inner and outer shell thicknesses, the thicker inner shell being provided for accommodating expected erosion and corrosion of the inner shell during operations with fluid flow. Of course, as will be recognized by those in the art, the exact dimensions depicted in FIGS. 10 and 11 examples may be suited as sleeve liners for a particular fluid flow device conduit (e.g., a ball valve inlet/outlet port). For other fluid flow devices different inside and outside diameters and axial lengths (as well as shell thicknesses) may be needed or desirable.

Currently available simulation test results demonstrate that it is possible for an airtight Inconel sleeve using a 20% infill pattern to operate at high pressures—while extending valve cycle life (as compared to approximately 1,800 cycles having no thermal liner sleeve) by more than 2,000% (e.g., up to 40,000 cycles). Prior Inconel thermal spray coatings only extended cycle life to approximately 2,900 cycles.

A desired infill pattern 3D data file can be created with conventional computer aided design software (e.g., CREO software designed by Parametric Technology Corporation or nTopology's "element pro" software or an ANSYS plug-in offered by Ansys, Inc.) and thereafter suitably processed to provide a stereo-lithography (STL) file suitable for use by a 3D printer. With currently available commercial 3D printing services, it is possible work with a commercially available 3D printing company to develop the desired STL file to be used by that commercial service to manufacture the liner sleeve under suitable contractual business provisions. Of course such 3D printing processes can also be performed in-house if the facilities are available.

As noted above, some sleeve liner examples have closed ends and others have open ends. In general, the open-ended sleeves are less likely to experience buckle failure due to unequal inside/outside sleeve pressurization experienced by closed sleeve designs—and such an open end facilitates extraction of any undesired metal powder at the end of the 3D printing processes. However, as also noted above, a closed end sleeve can be made resistant to buckling by adding a suitably small pressurization equalization hole (or holes) though at least one of the inner and outer sleeve shells. And, as also noted above, the size of the pressurization hole(s) should be small enough to prevent ingress of thermally conductive particles contained in the controlled process fluid flow passing through the sleeve liner in use.

It is presently believed that a 20% infill pattern provides the lowest percentage of infill that can be used without unduly compromising sleeve strength. As the FEA tests indicate, 50% and 80% result in higher stresses (i.e., less thermal shock protection) but also make the sleeve stronger. However a 20% infill pattern reduces stress by almost 300% (as compared to having a 100% infill or no sleeve)—while having now been shown by laboratory prototype testing to provide sufficient sleeve strength. Accordingly, it is presently believed that 20% infill pattern is the optimal percentage infill.

A main objective for the infill pattern is, like strutting beams supporting a roof, to use the fewest strutting beams that can carry the load. And, since heat conducts faster through solid metal, it is desired to create as much interstice space as possible between the outer and inner shells of the sleeve. For reasons noted above, it is currently believed that a 20% infill pattern is better than higher percentages while concurrently providing sufficient strength for high pressure operations.

Figure 12:
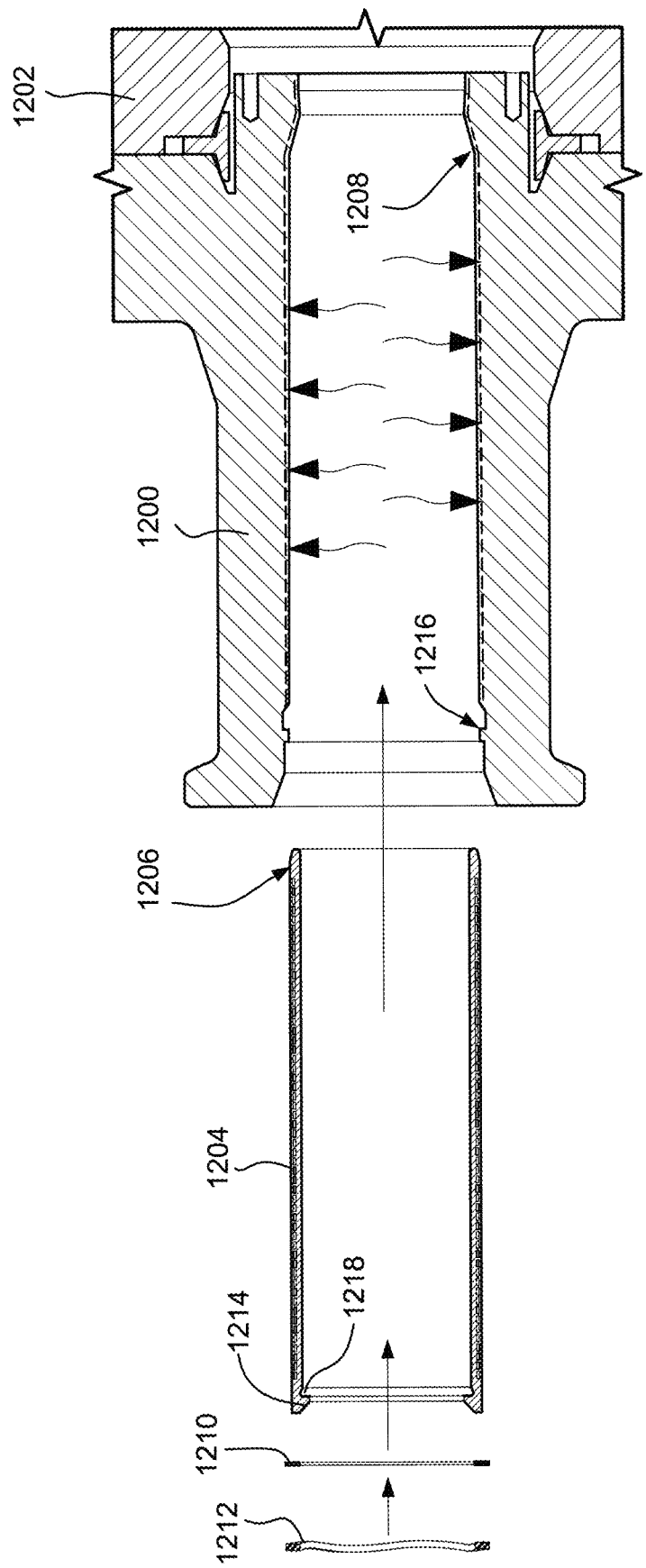
FIG. 12 is a schematic cross-section of an example thermally protective sleeve and associated components including a ball valve pipe fitting configured for protection by mated sealed engagement with the thermally protective sleeve.

In FIG. 12, an input port flow passage pipe 1200 is shown in cross section as connected conventionally to a ball valve body 1202. An example thermally protective sleeve 1204 is shown in position for insertion (along the arrowed line) into the inside bore of pipe 1200 where the distal sleeve end 1206 is configured to sealingly mate with a configured distal internal surface 1208 of the bore of pipe 1200. Also shown in FIG. 12 are sealing washer 1210 and retaining spring clip 1212 which, when installed against the proximal end 1214 of sleeve 1204 inside the bore of pipe 1200, are captured by the configured proximal internal surface 1216 of the bore of pipe 1200. Thus, both the proximal and distal ends of sleeve 1204 are sealed against entry of flowing fluid (or at least particles there-within that would adversely affect thermal sleeve protection) into the space between the outer shell of sleeve 1204 and the internal surface of the bore of pipe 1200.

The example thermal sleeve 1204 can be easily installed with a sliding slip or tight fit (e.g., 0.002 inch clearance) until, of course, the distal end 1206 of sleeve 1204 engages with the mated configured sealing surface 1208 at the distal end of the bore of pipe 1200. This facilitates both installation and removal of sleeve 1204.

Indeed, the proximal end 1214 of sleeve 1204 can include an internal "hook" configuration 1218 to permit engagement with a sleeve extraction tool when it becomes necessary or desirable to remove the sleeve (e.g., for replacement after substantial wear and tear). By dis-engaging the retaining spring clamp 1212 and the sealing washer 1210, the sleeve 1204 can be engaged at its proximal end (e.g., via the hooked internal configuration 1218) with an extraction tool permitting the sleeve to be easily pulled out for replacement/repair.

Figure 13:
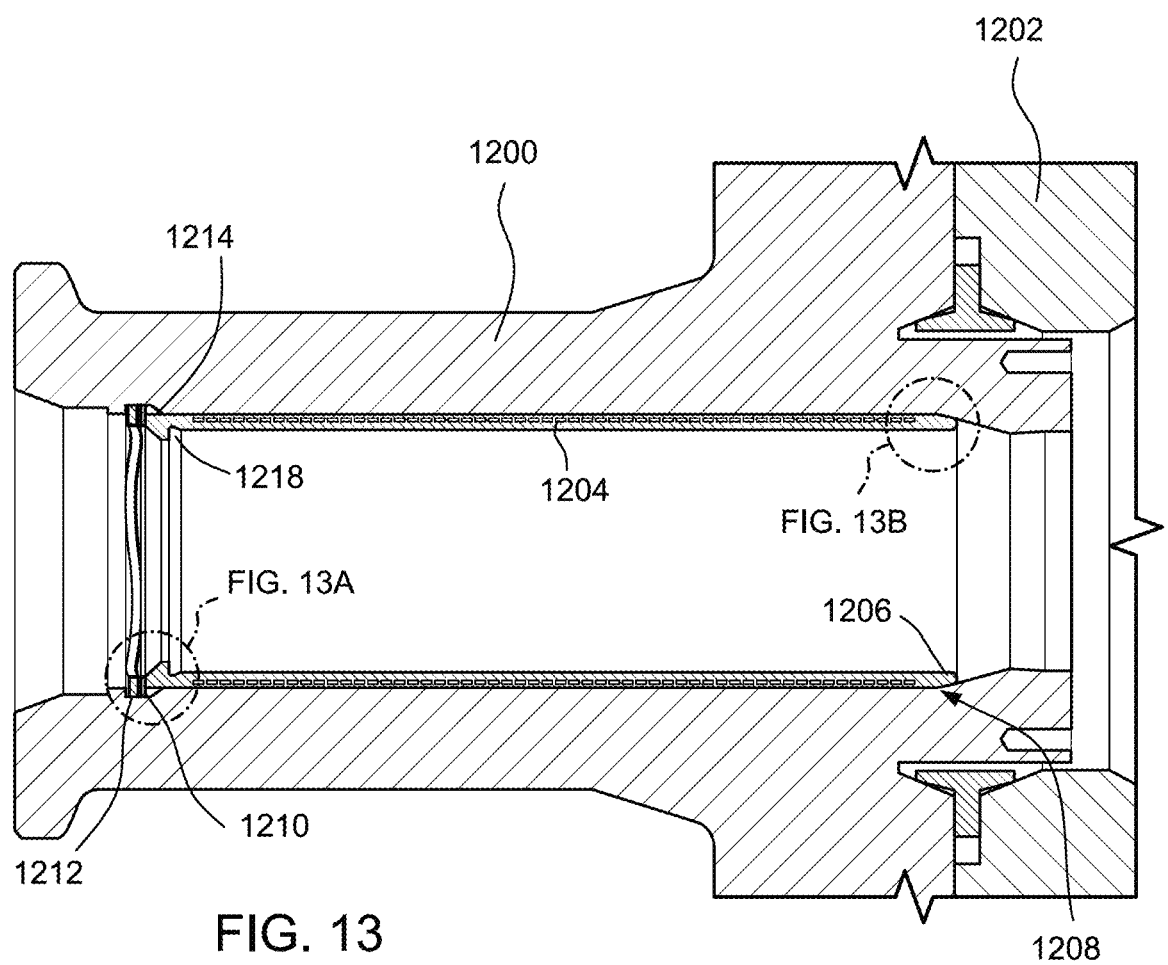
FIGS. 13, 13A and 13B provide a more detailed cross-section of the example thermally protective sleeve of FIG. 12 installed in the mating configured pipe fitting.
Figure 13A:
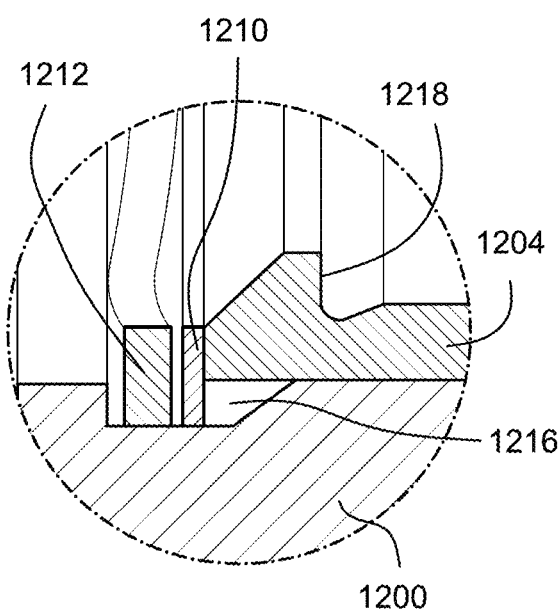
Figure 13B:
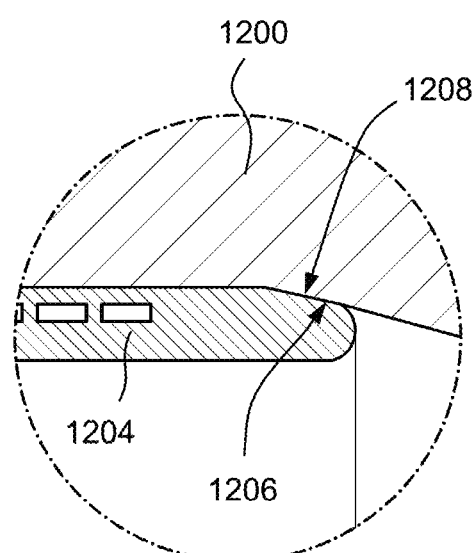

FIG. 13 depicts the example sleeve of FIG. 12 installed within pipe 1200. FIG. 12A depicts an enlarged view of the proximal end of sleeve 1204 with the sealing washer 1210 and retaining spring clip 1212 captured by the configured proximal end 1216 of the bore of pipe 12. FIG. 12B depicts an enlarged view of the distal end of sleeve 1204 sealingly engaged at its configured end 1206 with the configured internal sealing surface 1208 of the bore of pipe 1200.

Figure 14A:
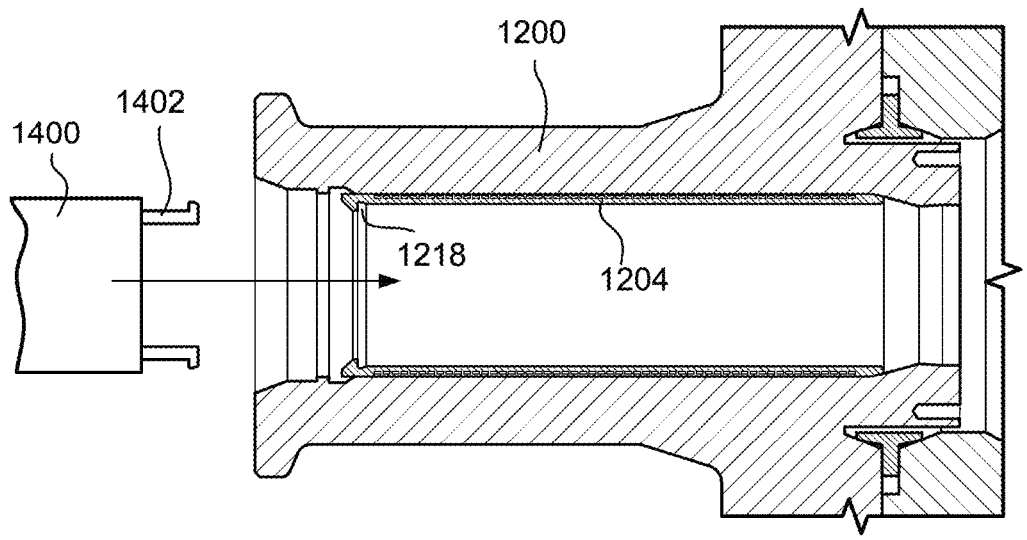
FIGS. 14A, 14B and 14C depict a sequence of steps involved in removing the example thermal protective sleeve of FIG. 12 after installation in the mating configured pipe fitting.
Figure 14B:
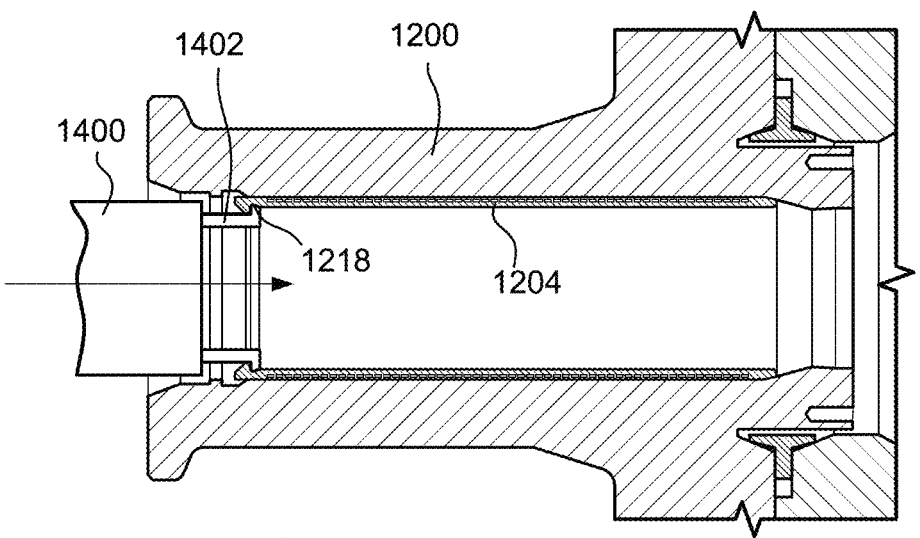
Figure 14C:
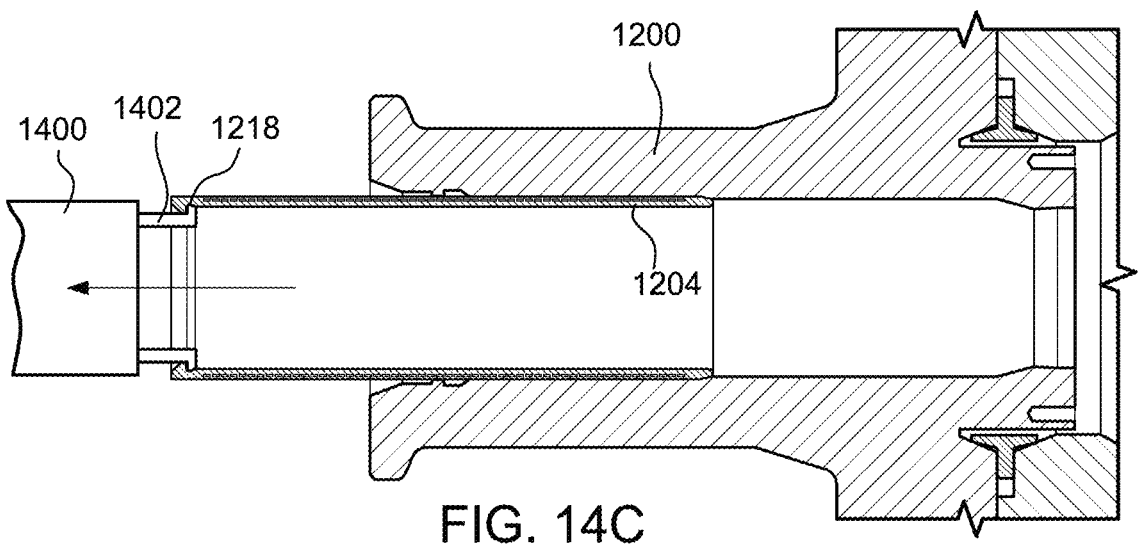

FIGS. 14A, 14B and 14C depict three successive stages involved in extraction of sleeve 1204 from pipe 1200. In FIG. 14A, sleeve 1204 has been previously installed within pipe 1200 but the retaining spring clip 1212 and sealing ring 1210 have now been removed (via conventional mechanical operations well known to those in the art). An extraction tool 1400 having a resilient hooked distal end portion 1402 (for engagement with internal hooked configuration 1218 of sleeve 1204) is positioned for longitudinal movement (see arrow) into the sleeve 1204. In FIG. 14B, the extraction tool 1400 has moved so that its resilient hooked distal end 1402 has become engaged with the internal hooked configuration 1218 of sleeve 1204. In FIG. 14C, the extraction tool 1400 is next moved in the opposite longitudinal direction (see arrow) pulling with it the sleeve 1204 so that it can be replaced/repaired.

Figure 15:
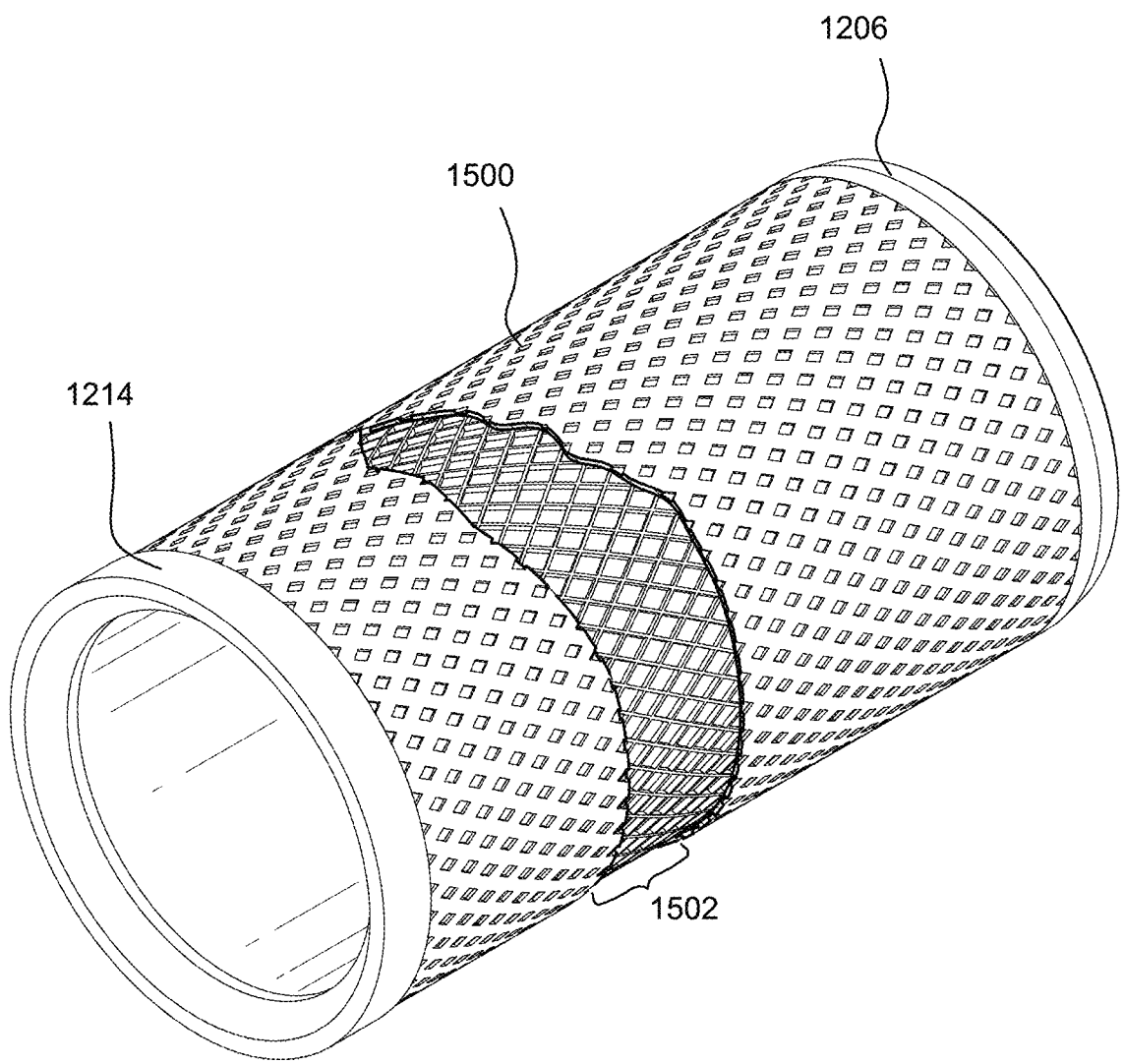
FIG. 15 provides a 3D rendering of an example thermally protective sleeve with a cut-away portion of the outer shell so as to reveal the internal tessellated infill pattern of supporting structures.

FIG. 15 is a 3D rendering of the example sleeve 1204 showing an apertured outer shell 1500 with the previously described configured distal end 1206 and proximal end 1214. A cut-away portion of the outer shell 1500 reveals diamond-shaped walls to define infill pattern 1502.

While it is ultimately desired to have a solid outer shell 1500, currently available 3D printing processes make an apertured outer shell more practical if closed ends (e.g., such as 1214 and 1206) are employed. This is because during some 3D printing processes for metals, a residue of fine metal powder remains in the printed 3D monolithic structure and needs to be extracted. While this fine metal dust is easily blown away with compressed air (or the like), there must be some provided space for ingress of the pressurized air and egress of the undesired residue of metal powder. In an open-ended embodiment (e.g., see FIGS. 1A, 1A-1, 2A, and 2A-1) ingress of compressed air and egress of metal powder can be accommodated though the open end. However, when both ends are closed, some other arrangement is needed.

Accordingly, the apertured outer shell 1500 (with an aperture over each diamond shaped interstice within the infill pattern 1502) has been found practical when both ends are sealed against ingress of fluid flow between the sleeve 1204 and internal surface of pipe 1200. That is, because the sliding tight or slip fit clearance between sleeve 1204 and the internal bore of pipe 1200 is sealed against ingress of fluid flows, it is permissible for the outer shell 1500 to have apertures. However, of course, the inner shell of sleeve 1204 needs to be solid (or to have only a very small pressure equalization hole sized to prevent ingress of solids in the fluid flow that would be adverse to thermal protection desirably provided by sleeve 1204.

Using different 3D metal printing processes it may be possible to avoid the need for extraction of a powered metal residue. Alternatively, it may be desired to fill the outer shell apertures and/or to cover then with a layer of solid metal. This would result in a non-apertured outer shell. However avoiding apertures in the outer shell do not presently appear necessary.

FIGS. 16, 17, 17A and 17B illustrate another example embodiment using an interference fit of solid bands at both ends and 20% infill. The interference fit seals both ends 1600 and 1602 of thermal sleeve 1604 to the internal bore of the protected pipe. As shown in more detail at the cross section of FIG. 17 and the enlarged segments of FIGS. 17A and 17B, sections of the ends (e.g., section 1606 of proximal end 1600 and section 1608 of distal end 1602) are machined for an interference fit within the bore of a protected pipe (e.g., inlet/outlet pipes of a ball valve). This means that in order to install sleeve 1604 within the protected flow device bore, typically the temperature of the protected bore must be increased sufficiently (and/or the temperature of the sleeve must be decreased sufficiently) to temporarily increase the clearance to a non-interference condition—sufficiently to permit insertion of the interference fit machined sleeve 1604. If desired, a snap retaining spring can be used at the proximal end of the sleeve to prevent subsequent movement of the sleeve within the pipe bore during high temperature operation. After installation, the temperature of the protected flow device is permitted to equalize with that of the sleeve so that a true interference sealed fit is established at both ends of the sleeve. However, as will be appreciated, this embodiment will entail substantially more effort during both sleeve installation and removal.

FIG. 18 includes three side-by-side photographs of short length open ended thermal protective sleeve examples (e.g., see FIGS. 1A, 1A-1, 2A and 2A-1) having 20% infill, 50% infill and 80% infill (respectively when viewed from left to right). As will be noted, the tessellated supporting structures are obliquely oriented (in a right-hand sense somewhat like the spokes of a bicycle wheel) between the inner and outer shells. These prototype examples were additively manufactured and tested to assess feasibility and validation of thermal protection and strength for these different infill pattern amounts. Such testing has shown the infill density of 20% was more efficient in reducing thermal shock and peak stress intensity.

Figure 16:
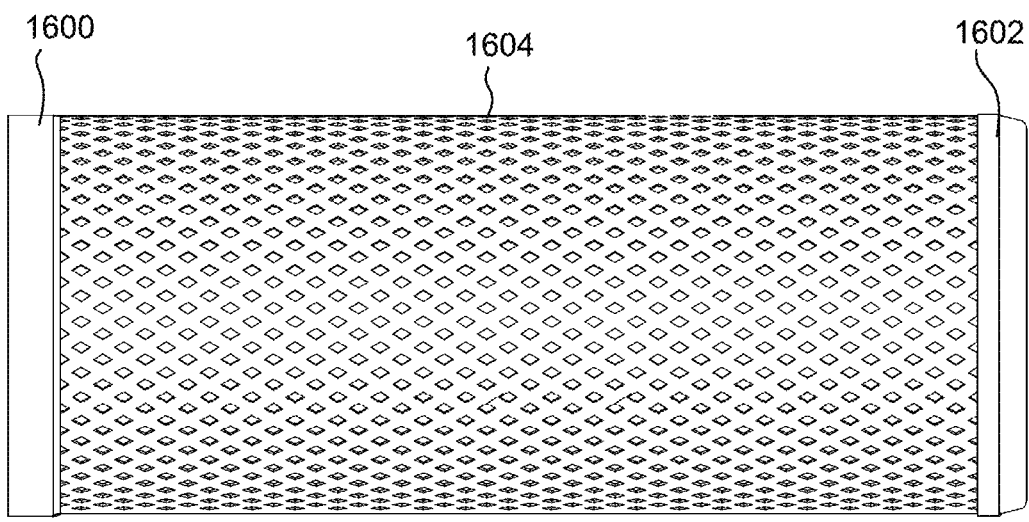
FIGS. 16, 17, 17A and 17B schematically depict another example embodiment of a thermally protective sleeve suited for an interference sealed fit within a protected pipe fitting.
Figure 17:
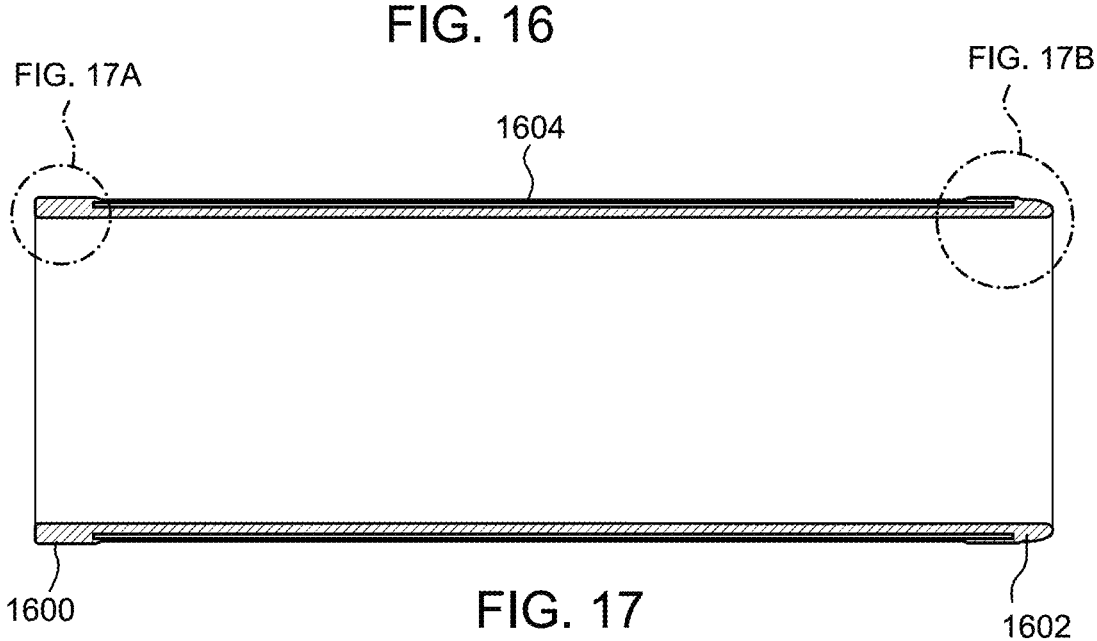
Figure 17A:
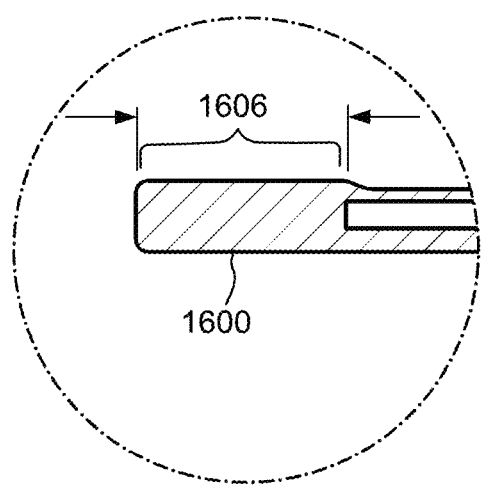
Figure 17B:
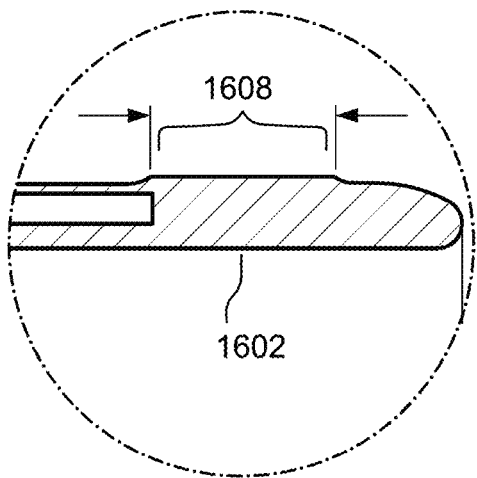

The example sleeve of FIG. 16 (i.e., interference fitted full size 9.5 inch long sleeve) was manufactured from Inconel 718° metal by 3D printing (laser powder bed fusion 3D printing process) and laboratory tested to assess feasibility in reducing thermal stress induced by rapidly cycling temperature in isolation valves under laboratory-simulated Ebullated Bed application conditions. The test valve body was submitted to five rapid heating and cooling cycles, approximately the number of cycles per day that the sleeve may experience during actual Ebullated Bed use. Thermal shock results show the heating rate of the body ID is reduced more than about 50% (compared to no sleeve).

An FEA simulation was also developed and compared with the experimental thermal transient data obtained by laboratory testing. This demonstrated a reduction of more than 70% of peak stress intensity when the thermal sleeve is used (with a possible error or perhaps 15%).

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A monolithic metal thermal insulating sleeve liner configured for use in a high pressure fluid flow device subjected to cyclic extreme thermal shock, said configured thermal insulating sleeve liner comprising:
a monolithic hollow metal cylindrical sleeve having two opposing spaced-apart ends and an outer diameter sized to slide into a bore of a fluid flow device, said ends being fused so as to seal against fluid flow between an inner surface of the fluid flow device bore and the outer diameter of the sleeve between said ends, while accommodating a fluid flow path there-within along an inside bore of said sleeve, said sleeve including internal interstices providing increased thermal resistance to heat flowing from inside the sleeve to outside the sleeve;
said monolithic hollow metal cylindrical sleeve comprising outer and inner shells integrally formed with tessellated support structures arrayed there-between.

2. The monolithic metal thermal insulating sleeve liner as in claim 1 wherein said support structures are uniformly distributed circumferentially around and axially along and between said inner and outer shells.

3. The monolithic metal thermal insulating sleeve liner as in claim 1 wherein said inner shell is thicker than said outer shell.

4. The monolithic metal thermal insulating sleeve liner as in claim 1 wherein said tessellated support structures create a cylindrical array of interstices and said outer shell includes an aperture aligned with each said interstice.

5. The monolithic metal thermal insulating sleeve liner as in claim 1 wherein said ends are solid and closed.

6. The monolithic metal thermal insulating sleeve liner as in claim 1 wherein the volume occupied by said support structures is less than 50% of the volume defined by the inside surfaces of said inner and outer shells.

7. The monolithic metal thermal insulating sleeve liner as in claim 1 wherein the volume occupied by said support structures is between 20% and 50% of the volume defined by the inside surfaces of said inner and outer shells.

8. The monolithic metal thermal insulating sleeve liner as in claim 1 wherein the volume occupied by said support structures is no more than 20% of the volume defined by the inside surfaces of said inner and outer shells.

9. The monolithic metal thermal insulating sleeve liner as in claim 1 wherein said metal comprises a nickel based alloy.

10. The monolithic metal thermal insulating sleeve liner as in claim 1 manufactured by a 3D printing additive manufacturing process.

11. The monolithic metal thermal insulating sleeve liner as in claim 1 installed within a fluid flow bore of the fluid flow device.

12. The monolithic metal thermal insulating sleeve liner as in claim 1 installed within the input or output pipe bore of a ball valve operating as a catalyst injection valve during operation of an ebullated bed hydro-processing ore refining operation.

13. The monolithic metal thermal insulating sleeve liner as in claim 1 wherein:
said sleeve is dimensioned for a non-interference fit into said bore of the fluid flow device, one of said ends is configured to sealingly engage with a mated internal configuration at a respectively corresponding one end of the fluid flow device bore; and the other of said ends is configured to engage with a sealing washer and retaining spring captured within a retaining configuration at the other end of the fluid flow device bore.

14. The monolithic metal thermal insulating sleeve liner as in claim 13 wherein said other end of the sleeve liner is internally configured to engage with an extraction tool when inserted therein.

15. The monolithic metal thermal insulating sleeve liner as in claim 14 in combination with an extraction tool having a resilient distal end configured to resiliently pass within said sleeve liner at said other end to engage the internal configuration at that end and facilitate removal of the sleeve liner from the protected fluid flow device bore.

16. The monolithic metal thermal insulating sleeve liner as in claim 1 wherein:

said sleeve is dimensioned for an interference fit into said fluid flow device bore at each of said two ends, said sleeve liner being insertable into said fluid flow device bore when dimensions of at least one of the sleeve liner and/or the protected fluid flow device is temporarily altered into a non-interference fit condition.

17. The monolithic metal thermal insulating sleeve liner as in claim 1 wherein said support structures comprise struts extending obliquely with respect to the inner and outer shell internal surfaces.

18. The monolithic metal thermal insulating sleeve liner according to claim 1, wherein said monolithic hollow metal cylindrical sleeve comprising outer and inner shells integrally formed with tessellated support structures arrayed there-between is formed of a super alloy material.

* * * * *